(12) United States Patent
Mihalache

(10) Patent No.: US 8,976,554 B2
(45) Date of Patent: Mar. 10, 2015

(54) CONTROL FOR FAULT-BYPASS OF CASCADED MULTI-LEVEL INVERTER

(71) Applicant: Siemens Corporation, Iselin, NJ (US)

(72) Inventor: Liviu Mihalache, Evans City, PA (US)

(73) Assignee: Siemens Corporation, Iselin, NJ (US)

( * ) Notice: Subject to any disclaimer, the term of this patent is extended or adjusted under 35 U.S.C. 154(b) by 29 days.

(21) Appl. No.: 13/621,984

(22) Filed: Sep. 18, 2012

(65) Prior Publication Data

US 2014/0078797 A1    Mar. 20, 2014

(51) Int. Cl.
| | |
|---|---|
| *H02H 7/122* | (2006.01) |
| *H02M 7/537* | (2006.01) |
| *H02M 7/5395* | (2006.01) |
| *H02M 7/49* | (2007.01) |
| *H02M 7/48* | (2006.01) |
| *H02M 1/00* | (2006.01) |
| *H02M 1/32* | (2007.01) |
| *H02M 7/483* | (2007.01) |

(52) U.S. Cl.
CPC ............ *H02M 7/537* (2013.01); *H02M 7/5395* (2013.01); *H02M 7/49* (2013.01); *H02M 2001/0012* (2013.01); *H02M 2001/0025* (2013.01); *H02M 2001/325* (2013.01); *H02M 2007/4835* (2013.01)
USPC .............................. 363/65; 363/50; 363/56.01

(58) Field of Classification Search
CPC ........... H02M 1/32; H02M 1/36; H02M 7/48; H02M 7/49; H02M 7/493; H02H 7/12; H02H 7/122; H02H 7/127; H02H 7/1213
USPC ...................................... 363/56.01, 50, 71, 65
See application file for complete search history.

(56) References Cited

U.S. PATENT DOCUMENTS

| | | | | |
|---|---|---|---|---|
| 5,986,909 | A * | 11/1999 | Hammond et al. | ............. 363/65 |
| 8,018,331 | B2 * | 9/2011 | Jang | ......................... 340/538.11 |
| 2007/0263418 | A1 | 11/2007 | Steinke | |
| 2012/0218795 | A1 | 8/2012 | Mihalache | |
| 2013/0107588 | A1 * | 5/2013 | Katayama et al. | .............. 363/37 |

FOREIGN PATENT DOCUMENTS

KR    20000061641 A    7/2008

OTHER PUBLICATIONS

P.W. Hammond. "Enhancing the Reliability of Modular Medium-Voltage Drives". IEEE Transactions on Industrial Electronics, vol. 49, No. 5. Oct. 2002.*
P. Lezana and G. Ortiz. "Extended Operation of Cascade Multicell Converters Under Fault Condition". IEEE Transactions on Industrial Electronics, vol. 56, No. 7. Jul. 2009.*

(Continued)

Primary Examiner — Gary L Laxton
Assistant Examiner — Kevin H Sprenger

(57) ABSTRACT

A cascaded multi-level inverter is controlled in fault bypass operation. Rather than relying on approximations or feedback forms, the reference voltages are generated as an analytic solution. The analytic solution and its implementation are not affected by the output frequency of the inverter and it is able to provide maximum possible balanced line-line voltage to a three-phase motor. In addition, the analytic solution provides exact limits for the allowable operation region of the motor power factor in order to prevent overvoltage conditions of the cell inverter.

20 Claims, 14 Drawing Sheets

(56) References Cited

OTHER PUBLICATIONS

P. Lezana et al., "Extended Operation of Cascade Multicell Converters Under Fault Condition," IEEE Transactions on Industrial Electronics, vol. 56, No. 7, pp. 2697-2703, Jul. 2009.

P. W. Hammond, "Enhancing the Reliability of Modular Medium-Voltage Drives," IEEE Transactions on Industrial Electronics, vol. 49, No. 5, pp. 948-954, Oct. 2002.

PCT International Search Report mailed Jul. 9, 2014 corresponding to PCT International Application No. PCT/US2013/059860 filed Sep. 16, 2013 (9 pages).

A Survey on Cascaded Multilevel Inverters; Mariusz Malinowski, K. Gopakumar, Jose Rodriguez and Marcelo A. Perez IEEE Transaction on Indutrial Electronics, vol. 57, No. 7, Jul. 2010, Seiten 2197-2206; 2010.

C. Cecati, et al. "A Suitable Control Technique for Fault-Tolerant Converters in Distributed Generation". In Industrial Electronics (ISEI), 2011 IEEE International Symposium, Jun. 27, 2011 (pp. 107-112).

\* cited by examiner

CONTROL FOR FAULT-BYPASS OF CASCADED MULTI-LEVEL INVERTER

BACKGROUND

The present embodiments relate to cascaded multi-level inverters. In particular, the embodiments relate to fault-bypass operation of such inverters.

Cascaded multilevel inverters are used in industrial control systems. For example, cascaded multilevel inverters are used to control medium voltage motor drives (e.g., 4.1 kV-13.8 kV motor drives) and/or static voltage compensators.

Cascaded multilevel inverters are modular. The high power inverter is made-up of a number of smaller series connected single-phase inverters or cells. Any number (e.g., 3-8) of cells may be used for a given leg of a three-phase system. When one or more of these cells fail, the inverter can still operate and produce balanced line-line voltages by computing different voltage references. Although the fault-bypass maximum line-line voltage is less than in normal conditions, continued operation at the reduced power level may be preferable to a complete shut-down.

To provide balance, each leg may be operated with the same number of cells. Where a number of cells fail in one leg, the other legs may bypass a corresponding number of cells. However this approach does not provide maximum available voltage to the motor since not all available cells are used. In another approach, a feedback mechanism is used to generate the voltage references. However, the accuracy of the method is influenced by the feedback gain, which has to be fairly high for good results. This approach makes it more challenging when the output frequency of the cascaded multilevel inverter is high as the gain cannot be increased beyond certain limits.

BRIEF SUMMARY

By way of introduction, the preferred embodiments described below include methods, systems, instructions, computer readable media, and digital electronic circuitry for control in fault-bypass of a cascaded multi-level inverter. The reference voltages are generated as an analytic solution based on the number of operating or active cells.

In a first aspect, a system is provided for control in fault-bypass of a cascaded multi-level inverter. A first plurality of first inverter cells leg connects in series for a first phase. A second plurality of second inverter cells leg connects in series for a second phase. A third plurality of third inverter cells leg connects in series for a third phase. The fault-bypass results in a different number of the inverter cells in the first plurality than of the second inverter cells in the second plurality being active. A processor is configured to generate reference voltages, free of feedback, for active ones of the first, second, and third inverter cell legs. All of the active first inverter cells are operated with a first common one of the reference voltages, all of the active second inverter cells being operated with a second common one of the reference voltages, and all of the active third inverter cells being operated with a third common one of the reference voltages.

In a second aspect, a method is provided for control in fault-bypass of a cascaded multi-level inverter. The cascaded multi-level inverter is operated in the fault-bypass. A first leg is identified as having fewer operating cells of the multi-lever inverter than a second leg of the multi-level inverter during the operating. The operating of cells of the second leg is controlled as a function of a number of the operating cells of the first leg.

In a third aspect, a system is provided for control in fault-bypass of a cascaded multi-level inverter. First, second, and third legs of the cascaded multi-level inverter are provided. At least the third leg has a fewer number of cells operating than a number the second leg and a number of the first leg. A processor is configured to control a pulse width modulation of the cells of the first, second, and third legs as a function of first, second, and third reference voltages, respectively. The first, second and third reference voltages each include a term for a balanced number of cells in the first, second and third legs, and the second and third reference voltages including a term for a difference between the number of the first leg and the number of the second leg without a difference between the number of the first leg and the number of the second leg or the number of the third leg.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Figure 1:
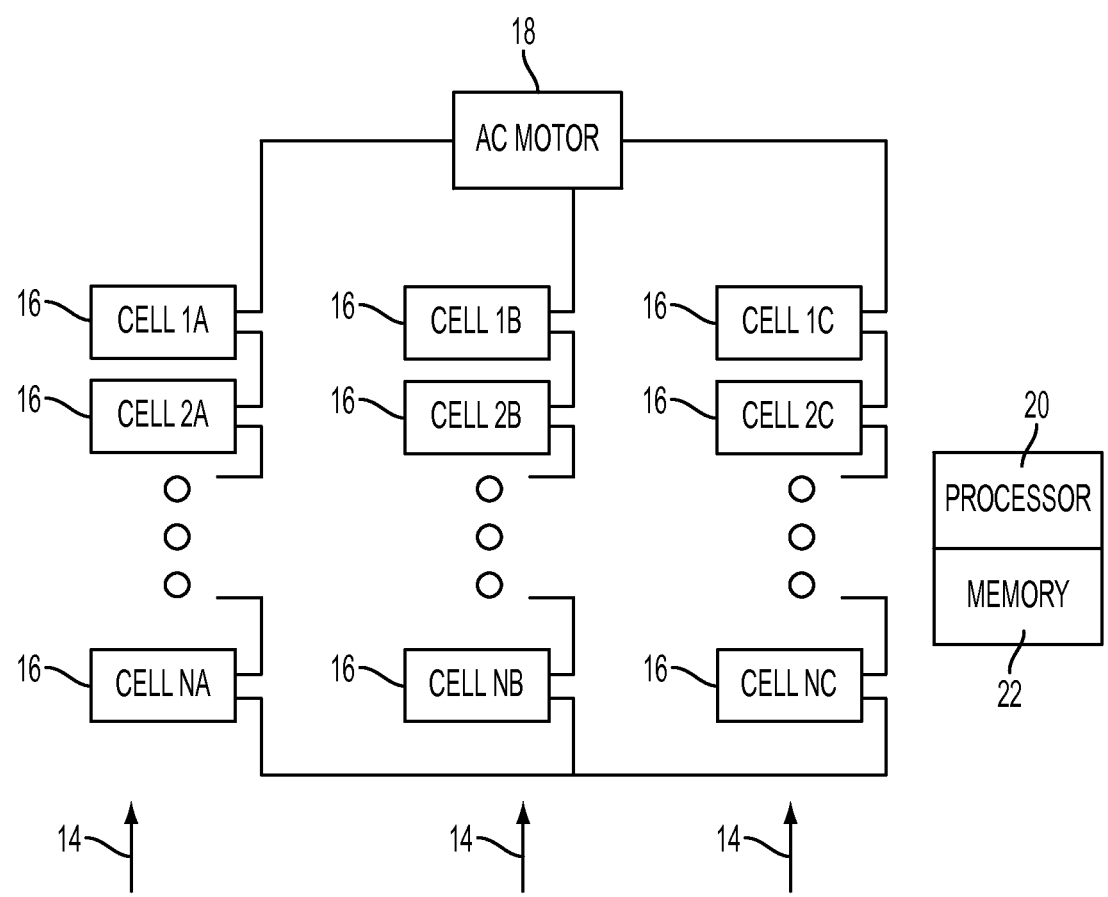
FIG. 1 is a block diagram of one embodiment of a system for control in fault-bypass of a cascaded multi-level inverter.

The voltage references for a cascaded multilevel drive in fault bypass are generated analytically. Compared to other approaches, this approach determines exact values from mathematical formulas for the phase voltage references in order to obtain maximum possible output line-line voltage. This approach does not rely on any approximation or feedback loop.

The cascaded multilevel inverter is a three-phase device. The three-phase system is modeled under bypass operation where one or more cells in one or more of the phase legs is inoperable, but each leg still includes operable cells.

The three phase system has legs labeled as A, B, and C (i.e., an ABC orientation). The voltage output by each leg is given in equations (1)-(3):

$$V_a = V \cdot \cos(\omega \cdot t) \tag{1}$$

$$V_b = V \cdot \cos\left(\omega \cdot t - \frac{2 \cdot \pi}{3}\right) \tag{2}$$

$$V_c = V \cdot \cos\left(\omega \cdot t + \frac{2 \cdot \pi}{3}\right) \tag{3}$$

When all the cells are active or participating in the generation of the three phase system, the reference voltages used to control each cell are written as equations (4)-(6):

$$V_{ref\_a1} = m \cdot \frac{2}{\sqrt{3}} \cdot \cos(\omega \cdot t) + CMO \tag{4}$$

-continued $$V_{ref\_b1} = m \cdot \frac{2}{\sqrt{3}} \cdot \cos\left(\omega \cdot t - \frac{2 \cdot \pi}{3}\right) + CMO \tag{5}$$

$$V_{ref\_c1} = m \cdot \frac{2}{\sqrt{3}} \cdot \cos\left(\omega \cdot t + \frac{2 \cdot \pi}{3}\right) + CMO. \tag{6}$$

where m is a modulation index for pulse width modulation and can have any value from 0 to 1, $\omega$ is the frequency, t is the time, and CMO is the common mode offset. The term $$\frac{2}{\sqrt{3}}$$

accounts for the 15% increase in the maximum modulation index due to the introduction of a common mode offset as given by equation (7):

$$CMO = -\frac{\text{Max}(V_{ref\_a1}, V_{ref\_b1}, V_{ref\_c1}) + \text{Min}(V_{ref\_a1}, V_{ref\_b1}, V_{ref\_c1})}{2}. \tag{7}$$

When a certain number of cells are bypassed due to a failure, the drive cannot deliver equal voltages in each phase. To maintain equal line-line voltages and thus achieve balanced phase currents, the amplitude and phase displacement for one or more of the phase voltages are adjusted from their normal values. To achieve this, the reference voltages are adjusted accordingly for each leg.

Assuming that the number of active cells on each phase during the bypass operation is $N_a$, $N_b$ and $N_c$, respectively, the per unit phase voltages generated by the drive during a fault bypass operation are written in a general form as:

$$V_a = M_a \cdot \cos(\omega \cdot t) + CMO \tag{8}$$

$$V_b = M_b \cdot \cos(\omega \cdot t - \phi_1) + CMO \tag{9}$$

$$V_c = M_c \cdot \cos(\omega \cdot t - \phi_2) + CMO \tag{10}$$

$$M_a = N_a \cdot m_1 \tag{11}$$

$$M_b = N_b \cdot m_1 \tag{12}$$

$$M_c = N_c \cdot m_1 \tag{13}$$

In equations (8)-(10), the common mode offset (CMO) is no longer assumed to be as given in equation (7), while $m_1$ is the maximum modulation index, under bypass operation.

The amplitudes of the line-line voltages are written as:

$$|V_{ab}| = \sqrt{M_a^2 - 2 \cdot M_a \cdot M_b \cdot \cos\phi_1 + M_b^2} \leq M_a + M_b \tag{14}$$

$$|V_{ac}| = \sqrt{M_a^2 - 2 \cdot M_a \cdot M_c \cdot \cos\phi_2 + M_c^2} \leq M_a + M_c \tag{15}$$

$$|V_{bc}| = \sqrt{M_b^2 - 2 \cdot M_b \cdot M_c \cdot \cos(\phi_1 - \phi_2) + M_c^2} \leq M_b + M_c \tag{16}$$

From equations (14) and (16), the two unknowns, $\phi_1$ and $\phi_2$ can be determined in order to maintain all three line-line voltages equal:

$$M_b^2 - M_c^2 = 2 \cdot M_a \cdot M_b \cdot \cos\phi_1 - 2 \cdot M_a \cdot M_c \cdot \cos\phi_2 \tag{17}$$

$$M_a^2 - 2 \cdot M_a \cdot M_c \cdot \cos\phi_2 = M_b^2 - 2 \cdot M_b \cdot M_c \cdot \cos(\phi_1 - \phi_2) \tag{18}$$

From equations (17) and (18), the two angles displacement may, in theory, be determined, but obtaining an analytical form is not possible. In addition, this approach cannot determine the expression for the common mode offset in equations (8)-(10) needed in order to obtain maximum line-line voltage. As a result, the motor will operate but will not be able to deliver maximum speed, power, and/or torque.

A different approach is to split the three-phase system into two systems: one which is a balanced in the number of cells on each leg that can be operated as any normal three-phase system and a second one which operates with different phase shifts in order to maintain balanced line-line voltages. However, that approach has the drawback of having different phase references to the cells belonging to the same phase. This means that when using a phase shifted PWM modulation, the waveform generated contains additional harmonics.

By using an analytical approach, the same reference voltage may be provided for each operating cell of a phase. Identical voltage references are provided to all cells belonging to the same phase, thus making sure that the use of a standard phase shifted PWM modulation does not lead to additional harmonics.

FIG. 1 shows a system for control in fault-bypass of a cascaded multi-level inverter. In the example of FIG. 1, the system is a cascaded multilevel medium voltage motor drive. The voltage frequency and/or amplitude are controlled to operate the alternating current (AC) motor 18, such as for industrial process control.

The AC motor 18 is any AC-type motor: synchronous, asynchronous, permanent magnet, and may be rated for low voltage, medium voltage or high-voltage. For example, medium-voltage AC motors may operate in the 4.1 kV to 13.8 kV range. Greater or lesser voltage may be used. More than one AC motor 18 may be connected. Other loads may be used instead of or in addition to the AC motor 18. The AC motor 18 responds to the voltage applied by the multilevel inverter on the three phases to increase, decrease or maintain a speed or position.

The cascaded multilevel inverter includes three phases or legs 14, each connected with the AC motor 18 and controlled by a processor 20 operating with a memory 22. Additional, different, or fewer components may be used. Other control structures than a processor 20 and memory 22 may be used.

Each of the legs 14 is formed from a plurality of cells 16. Any number of cells 16 may be used in each leg 14, such as 3-8 cells. In the example of FIG. 1, three legs 14 are each formed from a same number, N, of cells 16. Other inverters, connection arrangements, or combinations thereof may be used.

The cells 16 are single-phase inverters. The high power inverter for the AC motor 18 is made up of a cascade of cells 16 connected in series in different legs 14. Each cell 16 is responsive to control signals to alter the voltage level and/or frequency output, resulting in multilevel voltage waveform for each leg 14.

The cells 16 include power semiconductor switching devices, passive components (inductors, capacitors), control circuits, processors, interfaces, and other components for communicating with the processor 20. The cells 16 operate based on signals from the processor 20. For example, power levels are established by the processor 20. The control circuit or control board in an inverter cell 16 receives the voltage reference and generates the gating pulses for power switching devices using appropriate vector controls and pulse-width modulation. Alternatively, the processor 20 outputs the gating pulses provided to the cells 16 based on the voltage references.

Figure 2:
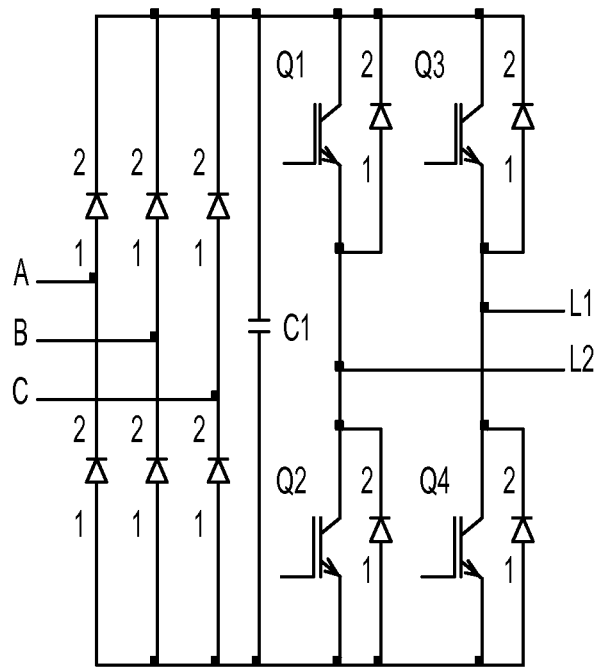
FIG. 2 is a circuit diagram of one embodiment of a cell for a cascaded multilevel inverter.

FIG. 2 shows one example circuit schematic for one of the cells 16. Four insulated gate bipolar transistors Q1-4 connect in line one (L1) and line two (L2) output groups. Diodes and a capacitor connect with a three phase input AC signal and across the transistors Q1-4. The transistors Q1-4 have gate input signals controlled by the processor 20 (FIG. 1). By pulse-width modulating the voltage reference, the processor 20 controls each of the cells 16 and thus, the voltage and frequency of the output, which is the voltage between lines L1 and L2. Other inverter circuits may be used with the same or different components (e.g., different types and/or numbers of transistors). The other inverter circuits may have a differential output voltage and may be connected in series with the output voltage of a different inverter.

Referring again to FIG. 1, one or more of the cells 16 may fail or not operate correctly. To continue operation of the cascaded multilevel inverter, the failed or inoperable cell or cells 16 are bypassed, such as by connecting L1 and L2 together in FIG. 2. A mechanical switch connects across each of the inoperable cells 16, allowing bypass of the selected cell 16. The mechanical switch is activated by applying a DC or AC voltage across a solenoid in response to a signal from processor 20. Alternatively, operable transistors Q1-4 of the cell 16 are used for bypass. For example, Q1 and Q3 are controlled to be always "on" to bypass, or Q2 and Q4 are controlled to be always "on" to bypass. Other bypass mechanisms may be used, where for instance an electronic device is used instead of a mechanical switch.

By bypassing a cell 16 in one leg 14, a different number of active cells 16 results in different legs 14. For example, the legs 14 of the three phases are labeled as A, B, and C. In the description below, the number of active cells 16 in leg A is Na, the number of active cells 16 in leg B is Nb, and the number of active cells 16 in leg C is Nc. If a cell 16 fails in leg C, then legs A and B have a greater number of operable cells 16. A cell 16 may fail in leg B, resulting in leg A having more operable cells 16 than legs B and C. Another cell 16 may fail in leg C, resulting in leg C having fewer operable cells 16 than leg B, which has fewer operable cells 16 than leg A. Any combination of different numbers (e.g., Na=N, Nb=N, and Nc=N−2) of operable or failed cells 16 in the different legs 14 may be provided. The bypass operation may continue until an insufficient number of cells 16 is provided in one or more of the legs 14, such as fewer than a threshold number (e.g., fewer than one or two).

When one or more of the cells 16 fail, the inverter may still operate and produce balanced line-line voltages by using different voltage references compared to the case where all cells 16 are available. The processor 20 generates different voltage references for controlling the transistors Q1-4 of the active cells 16. Although the available maximum line-line voltage provided to the AC motor 18 is less than in normal conditions (all cells operable), in many industrial processes, it is preferable to continue to operate at a reduced power level without a complete shut-down.

The processor 20 is a general processor, central processing unit, control processor, digital signal processor, application specific integrated circuit, field programmable gate array, digital circuit, analog circuit, combinations thereof, or other now known or later developed device for controlling inverter cells 16. The processor 20 is a single device or multiple devices operating in serial, parallel, or separately. The processor 20 may be a main processor of a computer, or may be a processor for handling some tasks in a larger system, such as a controller in a panel or programmable logic controller.

The processor 20 is configured by instructions, design, hardware, and/or software to be able to perform the acts discussed herein. For example, the processor 20 is configured to generate the reference voltages by accessing a look-up table in the memory 22 by the combination of operable or bypassed cells 16 per leg 14. The look-up table provides the analytical solution in the form of stored reference voltages for the appropriate bypass situation. In other embodiments, the processor 20 performs one or more calculations to analytically solve for the reference voltages as needed.

The processor 20 generates the control reference voltages or signals necessary to control inverter cells 16. The reference voltages are generated for active ones of the inverter cells 16. Reference voltages are not generated for the bypassed or inactive cells 16.

The reference voltage is compared to a triangle wave. The result of the comparison is a pulse width modulation signal which is amplified by a gate driver circuit and then applied to each IGBT's Q1-Q4 of a cell 16. When the reference voltage is higher than the triangle waveform, Q1 is turned on. When the reference voltage is lower than the triangle waveform Q1 is turned off. Q1 and Q2 are always switched in opposite manner: when one is turned on the other one is turned off and vice-versa. Similar operation occurs for Q3 and Q4, the only difference being that the triangle waveform used is in opposite phase with respect to the triangle waveform used for Q1 and Q2. The pulse wave modulation is responsive to the reference voltage. Control of the reference voltage controls the operation of the transistors Q1-4 of the active cells 16. The processor 20 performs the comparison. Alternatively, circuitry of the cells 16 performs the comparison.

One reference voltages is generated for each of the legs 14. For example, all of the operable cells 16 of a given leg 14 operate using the same reference voltage, but different reference voltages are provided to different legs 14. The pulse width modulation of one leg 14 is different than for another leg 14.

The processor 20 is configured to generate the reference voltages for the cells 16 of the legs 14 such that an equal magnitude voltage is provided between each two phases, therefore a balanced three-phase line-line voltage is applied on the motor. The reference voltages are altered or controlled to provide the desired voltage, frequency and phase relationship for controlling the AC motor 18. Other voltage, frequency and/or phase limitations may be used, depending on the operation of the AC motor 18 or other load.

The processor 20 is configured to generate the reference voltages based on the number of available cells on each leg. According to equations (19)-(21), three numbers defined as Min, Mid and Max represent the minimum, medium and maximum number of available cells per phase, respectively, once the cascaded multilevel inverter has entered bypass operation:

$$\text{Min} = \min\{N_a, N_b, N_c\} \quad (19)$$

$$\text{Mid} = \text{mid}\{N_a, N_b, N_c\} \quad (20)$$

$$\text{Max} = \max\{N_a, N_b, N_c\} \quad (21)$$

The following matrix notations represent the original inverter structure (normal), having N cells per phase and the inverter operating in bypass operation, having $N_a$, $N_b$ and $N_c$ cells per phase, respectively:

$$I_{Normal} = \begin{bmatrix} N \\ N \\ N \end{bmatrix} \quad (22)$$

$$I_{Bypass} = \begin{bmatrix} N_a \\ N_b \\ N_c \end{bmatrix} \quad (23)$$

In one example, the greatest number of bypassed cells 16 is assigned to the leg C, a middle number to leg B, and the least number to leg A. This is represented as:

$$\text{Min} = N_c, \text{Mid} = N_b, \text{Max} = N_a \quad (24).$$

Different legs may be associated with the minimum, middle, or maximum numbers of active cells 16.

Following the assumption from equation (23), the inverter under bypass operation may be represented in the form:

$$I_{Bypass} = \begin{bmatrix} \text{Max} \\ \text{Mid} \\ \text{Min} \end{bmatrix} \quad (25)$$

$$= \begin{bmatrix} \text{Min} \\ \text{Min} \\ \text{Min} \end{bmatrix} + \begin{bmatrix} \text{Mid} - \text{Min} \\ \text{Mid} - \text{Min} \\ 0 \end{bmatrix} + \begin{bmatrix} \text{Max} - \text{Mid} \\ 0 \\ 0 \end{bmatrix}$$

$$= I_1 + I_2 + I_3$$

From equation (25), the inverter under bypass operation may be thought of as a combination of three inverters, $I_1$, $I_2$ and $I_3$. The first component, $I_1$, corresponds to a regular inverter operated with a balanced set of voltage references. An equal number of cells 16 are provided in each leg for this first set of cells, or inverter $I_1$. The known common mode offset may be applied to the reference voltage of the first component or set $I_1$ to increase the modulation index. The second set of cells or inverter $I_2$ corresponds to an inverter in which only two phases may be modulated. The third set of cells 16 or inverter $I_3$ corresponds to an inverter where only one phase may be modulated.

For the analytic solution, the processor 20 generates the reference voltages based on the numbers of active inverter cells 16 from the legs with the minimum and medium numbers of active cells 16. The third component, $I_3$, cannot bring any contribution to the maximum achievable line-line voltage, but may influence the harmonic spectrum. The analytic solution may use the first and second sets of cells, $I_1$ and $I_2$ and not use third set $I_3$ for generating the reference voltages. The maximum line-to-line voltage of the phases uses the first and second components ($I_1$ and $I_2$) and the corresponding minimum and medium numbers, but not the maximum term which only occurs in the third component, $I_3$. The maximum line-to-line voltage of the overall inverter is a sum of voltages from legs C and B of the active inverters cells. The reference voltages for each leg include terms for a balanced number of cells and a term for two legs based on a difference between the medium and minimum numbers of cells 16 without being based on the maximum number of cells 16 (or a corresponding difference from the maximum).

Figure 3A:
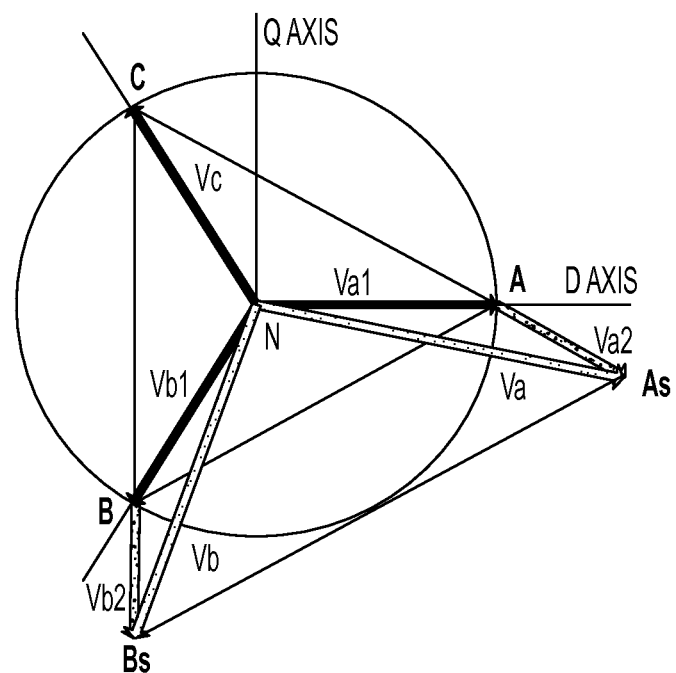
FIGS. 3A-C are graphic representations of balanced line-line voltage in situations with different bypassed cells in different phases.
Figure 3B:
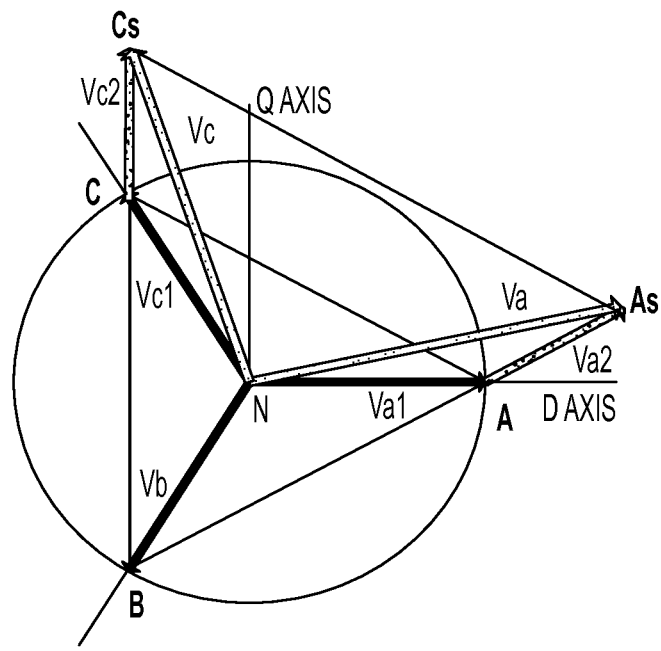
Figure 3C:
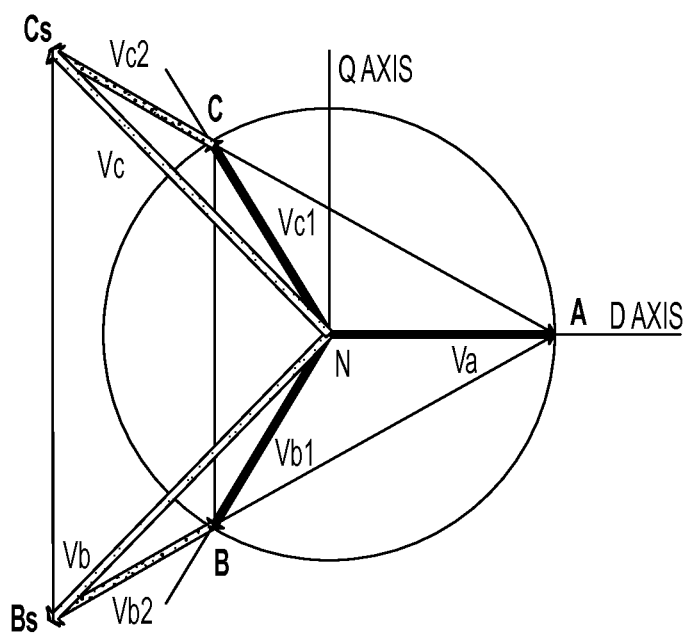

FIGS. 3A-C show how a three-phase line-line balanced system is obtained, when the number of minimum operating cells is on phases C, B and A, respectively. Since the phase or leg labels A, B, and C are arbitrarily assigned, the procedure is similar for all situations. Accordingly, the explanation below is for FIG. 3A, which corresponds to the assumption in equation (24). The results may be extended to the situations of FIGS. 3B and C.

From FIG. 3A, the inverter $I_1$ from decomposition of equation (25) is considered as formed by the vectors $V_{a1}$, $V_{b1}$, and $V_c$. $V_{a1}$, $V_{b1}$ and $V_c$ represent a balanced inverter having the minimum number of cells 16 per phase. In this way, all the available cells on phase C are utilized but there are more cells available on phases A and B. To maintain a balanced line-line voltage, the remaining cells on these two phases may be used in such a way that the vector produced by the extra difference between the middle and the minimum numbers (Mid−Min) of cells 16 in phase A, $V_{a2}$, is aligned with the vector CA produced by inverter $I_1$ while at the same time, the vector produced by the extra difference between the middle and the minimum numbers (Mid−Min) of cells in phase B, $V_{b2}$, is aligned with the vector CB produced by inverter $I_1$. This vector system of $V_{a2}$ and $V_{b2}$ is the second term in equation (25). From geometry, the triangle $A_sB_sC$ is still equilateral, just as ABC, meaning that the line-line system produced in this manner is still balanced. In essence, a number of (Min) cells have the regular voltage references of a balanced system as given by equations (4)-(7) while the cells of the difference in the minimum from the middle number (Mid−Min) of cells have the references as given below by equations (26) and (27):

$$V_{ref\_a2} = m \cdot \cos\left(\omega \cdot t - \frac{\pi}{6}\right) \tag{26}$$

$$V_{ref\_b2} = m \cdot \cos\left(\omega \cdot t - \frac{\pi}{2}\right) \tag{27}$$

Also from FIG. 3A, the maximum line-line voltage produced is written as the sum of the line-line voltage of the inverter $I_1$ plus the voltage produced by the inverter $I_2$:

$$V_{LINE-LINE\_BYPASS}=CA_s=CB_s=A_sB_s=V_{LINE-LINE\_I_1}+V_{a2}=+V_{LINE-LINE\_I_1}+V_{b2} \tag{28a}$$

Recall that inverter $I_1$ is a balanced system. A standard CMO is added as expressed in equations (4)-(7), and with a maximum modulation index of $$\frac{2}{\sqrt{3}},$$

considering equations (11)-(13), it follows that, in PER UNIT terms:

$$V_{LINE-LINE\_I_1} = CA_s \tag{28b}$$
$$= CB_s$$
$$= A_sB_s$$
$$= \text{Min} \cdot \frac{2}{\sqrt{3}} \cdot \sqrt{3}$$
$$= 2 \cdot \text{Min}$$
$$= 2 \cdot N_c$$

Since there are Nb−Nc (Mid−Min) cells to which references of equations (26) and (27) apply, and with a maximum modulation index of 1, the maximum voltage that can be obtained by system $I_2$ is given by:

$$V_{a2}=V_{b2}=(\text{Mid}-\text{Min})=N_b-N_c \tag{28}$$

From equations (28a)-(28b), the maximum PER UNIT line-line voltage under bypass is:

$$V_{LINE-LINE\_BYPASS}=2 \cdot N_c+N_b-N_c=N_b+N_c \tag{29}$$

The relationship of equation (29) was developed under the assumptions of equation (24) that the minimum number of cells are on phase C and maximum number of cells are on phase A. In a more general form, equation (29) is rewritten such that the maximum line-line voltage during bypass operation is written in PER UNIT as:

$$V_{LINE-LINE\_BYPASS}=\text{Min}+\text{Mid} \tag{30}$$

Comparing the general expressions of equations (14)-(16) with equation (30), this analytical solution is able to achieve maximum line-line voltage under bypass operation.

The solution obtained so far uses two different sets of waveforms for cells that belong to the same phase. A number Nc (Min) of cells 16 in each of the three phases have the references given in equations (4)-(7), and a number, Nb−Nc (Mid−Min), of cells 16 on two phases, A and B, have the references given by equations (26)-(27) under the assumptions of equation (24). This is represented as:

$$V_{ref\_A_i} = V_{ref\_a1} \tag{31}$$
$$= m \cdot \frac{2}{\sqrt{3}} \cdot \cos(\omega \cdot t) + CMO,$$
for each of the (Min) cells, i.e. $1 < i <$ (Min), and $$V_{ref\_A_j} = V_{ref\_a2} \tag{32}$$
$$= m \cdot \cos\left(\omega \cdot t - \frac{\pi}{6}\right), \text{ for each of the (Mid-Min) cells,}$$
i.e. $1 < j <$ (Mid-Min).

The introduction of different phase shifts as well as magnitudes to the cells 16 for the same phase has a detrimental effect when a phase shifted PWM modulation method is used. The use of different references in controlling different cells which belong to the same phase introduces additional harmonics in each phase voltage.

In the proposed analytic solution, all cells 16 pertaining to one phase are operated with the same voltage reference. The reference voltages for different phases are different, but all of the cells of each phase use the same reference voltage. Adding equations (31) and (32) provides a single reference as if one single cell is present on phase A. Since there are a number Nb (Mid) of cells 16 per phase in leg A, the single reference is averaged by all cells as:

$$V_{ref\_A\_Bypass} = \frac{\left(\sum_1^{Min} V_{ref\_A_i} + \sum_1^{(Mid-Min)} V_{ref\_A_j}\right)}{Mid}$$
$$= \frac{\text{Min}}{\text{Mid}} \cdot V_{ref\_a1} + \frac{(\text{Mid}-\text{Min})}{\text{Mid}} \cdot V_{ref\_a2}$$

In a similar way, the reference for all cells 16 in phase B is written as:

$$V_{ref\_B\_Bypass} = \frac{\text{Min}}{\text{Mid}} \cdot V_{ref\_b1} + \frac{(\text{Mid}-\text{Min})}{\text{Mid}} \cdot V_{ref\_b2} \tag{34}$$

Finally, the reference on phase C, the leg with the lowest number Nc of working cells 16, is unchanged. As a result, equation (6) provides the reference:

$$V_{ref\_C\_Bypass}=V_{ref\_c1} \tag{35}$$

From equations (33) and (34), the reference voltage for phases A and B are functions of the number of active cells 16 in phases C and B, but not phase A (i.e., the phase with the largest number of active cells 16). The reference voltages of phases A and B are ratios of the reference voltages from the first component $I_1$ and the second component $I_2$. The ratio for the reference voltage from the balanced first component is of Nc/Nb. The ratio for the reference voltage from the second component is (Nb−Nc)/Nb.

Since phase A has more active cells 16, all or only enough cells 16 to equal the middle number Nb of cells 16 may be used. When all of the active inverter cells 16 of phase A are used, the reference voltage is:

$$\frac{N_c}{N_a} \cdot \left( \frac{2}{\sqrt{3}} \cdot \cos(\omega \cdot t) + CMO \right) + \frac{(N_b - N_c)}{N_a} \cdot \cos\left(\omega \cdot t - \frac{\pi}{6}\right),$$

where Na is the number of the active inverter cells 16 in leg A. When Na−Nb of the active inverter cells 16 of leg A are not operated, the reference voltage for the active inverter cells 16 is:

$$\frac{N_c}{N_b} \cdot \left( \frac{2}{\sqrt{3}} \cdot \cos(\omega \cdot t) + CMO \right) + \frac{(N_b - N_c)}{N_b} \cdot \cos\left(\omega \cdot t - \frac{\pi}{6}\right)$$

The reference voltages obtained with equations (33) and (34) do not exceed unity. The cells 16 are not forced to operate in over-modulation. Over modulation is not produced, regardless of the bypass configuration as described in the following paragraph.

Assuming Min/Mid=α, where 0<α<1, the two references (33) and (34) are re-written as:

$$V_{ref\_A\_Bypass} = \alpha \cdot (V_{ref\_a1} - V_{ref\_a2}) + V_{ref\_a2} \quad (A1)$$

$$V_{ref\_B\_Bypass} = \alpha \cdot (V_{ref\_b1} - V_{ref\_b2}) + V_{ref\_b2} \quad (A2)$$

Looking at the definition of α, it follows that the highest amplitudes for the voltage references occur when Min=Mid−1, that is when only one cell 16 is bypassed. By plotting for $V_{ref\_A\_Bypass}$ at maximum modulation index for various values of α, the modulation waveforms never exceed unity. This assumes that on the phase with maximum number of cells 16, a number of (Max−Mid) healthy cells 16 are also bypassed. If, however all cells 16 are used on that particular phase, the reference will be smaller, by a factor of Mid/Max, so the plot represents the worst case scenario. Similarly, a family of plots for $V_{ref\_B\_Bypass}$ at maximum modulation for various values of α show that the modulation waveforms never exceed unity. Not surprisingly, the two waveforms appear to be symmetric as suggested by the vector representation depicted in FIGS. 3A-C.

From equation (25), the inverter under bypass operation is split in three fictitious inverters $I_1$, $I_2$ and $I_3$ but all the analysis has ignored the last component, $I_3$. The result obtained by ignoring this third component however has demonstrated that the maximum line-line voltage is achieved without the use of this last component. This is physically explained by the fact that the line-line voltage cannot be bigger than the maximum voltage achievable by the two phases with the lowest number of cells. With the assumptions from equation (24), the extra (Max−Mid) cells 16 which are available on one phase (e.g., A in this case) cannot contribute anymore to the maximum available line-line voltage.

A benefit may be gained if all available switches are used in the leg 14 with the most operable cells 16. The line-neutral voltage of that leg 14 may have the dominant harmonics pushed higher into the frequency spectrum. Because of that, two line-line voltages will also be slightly improved, (Max−Min) and (Max−Mid), but (Mid−Min) voltage is not influenced.

If all cells are to be used in the phase with the maximum number of operable cells 16 (e.g., A in this case), the reference on leg A is to be changed to:

$$V_{ref\_A\_Bypass} = \frac{\text{Min}}{\text{Max}} \cdot V_{ref\_a1} + \frac{(\text{Mid} - \text{Min})}{\text{Max}} \cdot V_{ref\_a2} \quad (36)$$

Depending on the particular number of cells 16, and depending on the application, the additional benefit of using all cells 16 may not be justified. Since the (Max−Mid) cells 16 on the phase with the highest number of cells 16 cannot further increase the line-line voltage, these extra cells 16 may be also bypassed, either in the same way as the faulty cells 16 or by keeping in the either top or bottom switches in the cells 16 in the on position, in order to reduce the losses.

The above discussion deals with one possibility of the example inverter of FIG. 1 where leg C has the fewest number of active cells 16, with leg B having a middle number, and leg A having the most number of active cells 16. In other situations, other arrangements or distributions of the active cells are provided 16. Below are analytical reference voltage calculations for other distributions:

$$u = m \cdot \frac{1}{\sqrt{3}} \cdot \cos(\omega \cdot t)$$

$$v = m \cdot \frac{2}{\sqrt{3}} \cdot \cos\left(\omega \cdot t - \frac{2 \cdot \pi}{3}\right)$$

$$w = m \cdot \frac{2}{\sqrt{3}} \cdot \cos\left(\omega \cdot t + \frac{2 \cdot \pi}{3}\right)$$

$$CMO = -\frac{\text{Max}(u, v, w) + \text{Min}(u, v, w)}{2}$$

Case 1. $N_a \geq N_b \geq N_c$

If $(N_a - N_b)$ cells are not used on phase A:

$$V_{ref\_A\_Bypass} =$$
$$\frac{N_c}{N_b} \cdot \left( m \cdot \frac{2}{\sqrt{3}} \cdot \cos(\omega \cdot t) + CMO \right) + \frac{(N_b - N_c)}{N_b} \cdot m \cdot \cos\left(\omega \cdot t - \frac{\pi}{6}\right)$$

If all $N_a$ cells are used on phase A:

$$V_{ref\_A\_Bypass} =$$
$$\frac{N_c}{N_a} \cdot \left( m \cdot \frac{2}{\sqrt{3}} \cdot \cos(\omega \cdot t) + CMO \right) + \frac{(N_b - N_c)}{N_a} \cdot m \cdot \cos\left(\omega \cdot t - \frac{\pi}{6}\right)$$

$$V_{ref\_B\_Bypass} = \frac{N_c}{N_b} \cdot \left( m \cdot \frac{2}{\sqrt{3}} \cdot \cos\left(\omega \cdot t - \frac{2 \cdot \pi}{3}\right) + CMO \right) +$$

-continued $$V_{ref\_C\_Bypass} = m \cdot \frac{2}{\sqrt{3}} \cdot \cos\left(\omega \cdot t + \frac{2 \cdot \pi}{3}\right) + \frac{(N_b - N_c)}{N_b} \cdot m \cdot \cos\left(\omega \cdot t - \frac{\pi}{2}\right) + CMO$$

Case 2. $N_a \geq N_c \geq N_b$

If $(N_a - N_c)$ cells are not used on phase A:

$$V_{ref\_A\_Bypass} = \frac{N_b}{N_c} \cdot \left(m \cdot \frac{2}{\sqrt{3}} \cdot \cos(\omega \cdot t) + CMO\right) + \frac{(N_c - N_b)}{N_c} \cdot m \cdot \cos\left(\omega \cdot t + \frac{\pi}{6}\right)$$

If all $N_a$ cells are used on phase A:

$$V_{ref\_A\_Bypass} = \frac{N_b}{N_a} \cdot \left(m \cdot \frac{2}{\sqrt{3}} \cdot \cos(\omega \cdot t) + CMO\right) + \frac{(N_c - N_b)}{N_c} \cdot m \cdot \cos\left(\omega \cdot t + \frac{\pi}{6}\right)$$

$$V_{ref\_B\_Bypass} = m \cdot \frac{2}{\sqrt{3}} \cdot \cos\left(\omega \cdot t - \frac{2 \cdot \pi}{3}\right) + CMO$$

$$V_{ref\_C\_Bypass} = \frac{N_b}{N_c} \cdot \left(m \cdot \frac{2}{\sqrt{3}} \cdot \cos\left(\omega \cdot t + \frac{2 \cdot \pi}{3}\right) + CMO\right) + \frac{(N_c - N_b)}{N_c} \cdot m \cdot \cos\left(\omega \cdot t + \frac{\pi}{2}\right)$$

Case 3. $N_b \geq N_a \geq N_c$ $$V_{ref\_A\_Bypass} = \frac{N_c}{N_a} \cdot \left(m \cdot \frac{2}{\sqrt{3}} \cdot \cos(\omega \cdot t) + CMO\right) + \frac{(N_a - N_c)}{N_a} \cdot m \cdot \cos\left(\omega \cdot t - \frac{\pi}{6}\right)$$

If $(N_b - N_a)$ cells are not used on phase B:

$$V_{ref\_B\_Bypass} = \frac{N_c}{N_a} \cdot \left(m \cdot \frac{2}{\sqrt{3}} \cdot \cos\left(\omega \cdot t - \frac{2 \cdot \pi}{3}\right) + CMO\right) + \frac{(N_a - N_c)}{N_a} \cdot m \cdot \cos\left(\omega \cdot t - \frac{\pi}{2}\right)$$

If all $N_b$ cells are used on phase B:

$$V_{ref\_B\_Bypass} = \frac{N_c}{N_b} \cdot \left(m \cdot \frac{2}{\sqrt{3}} \cdot \cos\left(\omega \cdot t - \frac{2 \cdot \pi}{3}\right) + CMO\right) + \frac{(N_a - N_c)}{N_b} \cdot m \cdot \cos\left(\omega \cdot t - \frac{\pi}{2}\right)$$

$$V_{ref\_C\_Bypass} = m \cdot \frac{2}{\sqrt{3}} \cdot \cos\left(\omega \cdot t + \frac{2 \cdot \pi}{3}\right) + CMO$$

Case 4. $N_b \geq N_c \geq N_a$ $$V_{ref\_A\_Bypass} = m \cdot \frac{2}{\sqrt{3}} \cos(\omega \cdot t) + CMO$$

If $(N_b - N_c)$ cells are not used on phase B:

$$V_{ref\_B\_Bypass} = \frac{N_a}{N_c} \cdot \left(m \cdot \frac{2}{\sqrt{3}} \cdot \cos\left(\omega \cdot t - \frac{2 \cdot \pi}{3}\right) + CMO\right) + \frac{(N_c - N_a)}{N_c} \cdot m \cdot \cos\left(\omega \cdot t - \frac{5 \cdot \pi}{6}\right)$$

If all $N_b$ cells are used on phase B:

$$V_{ref\_B\_Bypass} = \frac{N_a}{N_b} \cdot \left(m \cdot \frac{2}{\sqrt{3}} \cdot \cos\left(\omega \cdot t - \frac{2 \cdot \pi}{3}\right) + CMO\right) + \frac{(N_c - N_a)}{N_b} \cdot m \cdot \cos\left(\omega \cdot t - \frac{5 \cdot \pi}{6}\right)$$

$$V_{ref\_C\_Bypass} = \frac{N_a}{N_c} \cdot \left(m \cdot \frac{2}{\sqrt{3}} \cdot \cos\left(\omega \cdot t + \frac{2 \cdot \pi}{3}\right) + CMO\right) + \frac{(N_c - N_a)}{N_c} \cdot m \cdot \cos\left(\omega \cdot t + \frac{5 \cdot \pi}{6}\right)$$

Case 5. $N_c \geq N_b \geq N_a$ $$V_{ref\_A\_Bypass} = m \cdot \frac{2}{\sqrt{3}} \cos(\omega \cdot t) + CMO$$

$$V_{ref\_B\_Bypass} = \frac{N_a}{N_b} \cdot \left(m \cdot \frac{2}{\sqrt{3}} \cdot \cos\left(\omega \cdot t - \frac{2 \cdot \pi}{3}\right) + CMO\right) + \frac{(N_b - N_a)}{N_b} \cdot m \cdot \cos\left(\omega \cdot t - \frac{5 \cdot \pi}{6}\right)$$

If $(N_c - N_b)$ cells are not used on phase C:

$$V_{ref\_C\_Bypass} = \frac{N_a}{N_b} \cdot \left(m \cdot \frac{2}{\sqrt{3}} \cdot \cos\left(\omega \cdot t + \frac{2 \cdot \pi}{3}\right) + CMO\right) + \frac{(N_b - N_a)}{N_b} \cdot m \cdot \cos\left(\omega \cdot t + \frac{5 \cdot \pi}{6}\right)$$

If all $N_c$ cells are used on phase C:

$$V_{ref\_C\_Bypass} = \frac{N_a}{N_c} \cdot \left(m \cdot \frac{2}{\sqrt{3}} \cdot \cos\left(\omega \cdot t + \frac{2 \cdot \pi}{3}\right) + CMO\right) + \frac{(N_b - N_a)}{N_c} \cdot m \cdot \cos\left(\omega \cdot t + \frac{5 \cdot \pi}{6}\right)$$

Case 6. $N_c \geq N_a \geq N_b$ $$V_{ref\_A\_Bypass} = \frac{N_b}{N_a} \cdot \left(m \cdot \frac{2}{\sqrt{3}} \cdot \cos(\omega \cdot t) + CMO\right) + \frac{(N_a - N_b)}{N_a} \cdot m \cdot \cos\left(\omega \cdot t + \frac{\pi}{6}\right)$$

$$V_{ref\_B\_Bypass} = m \cdot \cos\left(\omega \cdot t - \frac{2 \cdot \pi}{3}\right) + CMO$$

If only $(N_c - N_a)$ cells are used on phase C:

$$V_{ref\_C\_Bypass} = \frac{N_b}{N_a} \cdot \left(m \cdot \frac{2}{\sqrt{3}} \cdot \cos\left(\omega \cdot t + \frac{2 \cdot \pi}{3}\right) + CMO\right) + \frac{(N_a - N_b)}{N_a} \cdot m \cdot \cos\left(\omega \cdot t + \frac{\pi}{2}\right)$$

If all $N_c$ cells are used on phase C:

$$V_{ref\_C\_Bypass} = \frac{N_b}{N_c} \cdot \left(m \cdot \frac{2}{\sqrt{3}} \cdot \cos\left(\omega \cdot t + \frac{2 \cdot \pi}{3}\right) + CMO\right) + \frac{(N_a - N_b)}{N_c} \cdot m \cdot \cos\left(\omega \cdot t + \frac{\pi}{2}\right)$$

The term m represents the modulation index and it is assumed to have values between 0 and 1, as the term $$\frac{2}{\sqrt{3}}$$

accounts for the 15% increase in the maximum modulation index due to the introduction of the common mode offset, where applicable.

From FIGS. 3A-C, when the load power factor exceeds certain limits, then some of the cells 16 are forced to operate in regeneration mode due to the shift in the neutral position. Operating some cells 16 in regeneration mode increases the DC-link voltage and eventually leads to a drive overvoltage trip if the drive is only uni-directional. The analytic solution for the reference voltage may be used to determine the safe operating range of the cells when the load power factor varies. The cells 16 located on the phase with the minimum (Min) number of cells 16 are not affected by the load power factor because the vector orientation of that particular phase is unchanged. These cells 16 will not experience any potential overvoltage as long as the load power angle is within −90 to +90 degrees.

With respect to FIG. 3A, for the cells on phases A or B, assuming that δ is the angle between the vector $A_sN$ and the D axis, the maximum load angle is limited to:

$$-\frac{\pi}{2} + \delta < \phi_{LOAD} < \frac{\pi}{2} - \delta \quad (37)$$

where $\phi_{LOAD}$ is the load power factor angle. The angle δ is determined as follows:

$$\frac{AA_s}{\sin\delta} = \frac{A_sN}{\sin\left(\frac{5\cdot\pi}{6}\right)} = 2 \cdot A_sN$$

$$AA_s = m \cdot (Mid - Min)$$

$$A_sN = \sqrt{\left(m \cdot \frac{2}{\sqrt{3}} \cdot Min\right)^2 + m^2 \cdot (Mid - Min)^2 - 2 \cdot m^2 \cdot \frac{2}{\sqrt{3}} \cdot Min \cdot (Mid - Min) \cdot \cos\frac{5\cdot\pi}{6}}$$

$$\sin\delta = \frac{Mid - Min}{2 \cdot \sqrt{\frac{4}{3} \cdot Min^2 + (Mid - Min)^2 + 2 \cdot Min \cdot (Mid - Min)}}$$

$$= \frac{\sqrt{3} \cdot (Mid - Min)}{2 \cdot \sqrt{3 \cdot Mid^2 + Min^2}}$$

To guarantee that no cells 16 in any phase are in danger of operating in regeneration mode, the load angle is restricted by the following condition:

$$-\frac{\pi}{2} + \arcsin\left(\frac{\sqrt{3} \cdot (Mid - Min)}{2 \cdot \sqrt{3 \cdot Mid^2 + Min^2}}\right) < \quad (38)$$

$$\phi_{LOAD} \leq \frac{\pi}{2} - \arcsin\left(\frac{\sqrt{3} \cdot (Mid - Min)}{2 \cdot \sqrt{3 \cdot Mid^2 + Min^2}}\right)$$

With respect to FIG. 3A (i.e., the minimum number of cells 16 on phase C), the first part of the inequality is the condition that no cells 16 are in regeneration mode on phase B, while the second part is the condition that no cells 16 are in regeneration mode on phase A. With respect to FIG. 3B (i.e., the minimum number of cells 16 on phase B), the first part of the inequality is the condition that no cells 16 are in regeneration mode on phase A, while the second part is the condition that no cells 16 are in regeneration mode on phase C. With respect to FIG. 3C (i.e., the minimum number of cells 16 on phase A), the first part of the inequality is the condition that no cells 16 are in regeneration mode on phase C, while the second part is the condition that no cells 16 are in regeneration mode on phase B.

During a bypass following a normal operation where the load angle is limited to between −π/2 and π/2, there can be only one phase where the cells 16 may be subjected to a regeneration mode. The phase in question may be determined if the load power factor is known. Using this method with equation (38), if the same number of cells 16 fails on any two phases, there is no need for additional restriction on the load power factor. This is a natural effect given the decomposition into different components (see equation 25). Since in practice only a certain number of cells 16 may be bypassed before the whole drive is stopped, equation (38) is used to tabulate and store the minimum power factor for a given drive and a given bypass configuration, thus reducing the overhead associated with the actual calculation of equation (38).

The processor 20 generates the reference voltages. The processor 20 uses the memory 22 for looking up the reference voltages. A look up table outputs the reference voltages as a function of input of numbers of active inverter cells in the different legs 14 (e.g., input of Na, Nb, and Nc). The corresponding reference voltages for each of the legs 14 and/or cells 16 are output. In alternative embodiments, the memory 22 stores instructions for calculating the reference voltages and performing any checks.

The memory 22 is a random access memory, system memory, cache memory, hard drive, buffer, database, combinations thereof, or other now known or later developed memory device for storing a look-up table of reference voltages as a function of distributions of operable cells for bypass fault operation of the cascaded multilevel inverter.

The memory 22 or other memory is alternatively or additionally a processor readable storage medium storing data representing instructions executable by the programmed processor 20 for control in fault-bypass of a cascaded multi-level inverter. The instructions for implementing the processes, methods and/or techniques discussed herein are provided on non-transitory processor-readable storage media processors, microcontrollers, digital signal processors or memories, such as a cache, buffer, RAM, removable media. The functions, acts or tasks illustrated in the figures or described herein are executed in response to one or more sets of instructions stored in or on the memory or the processor used. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, parallel processing, and the like.

Figure 4:
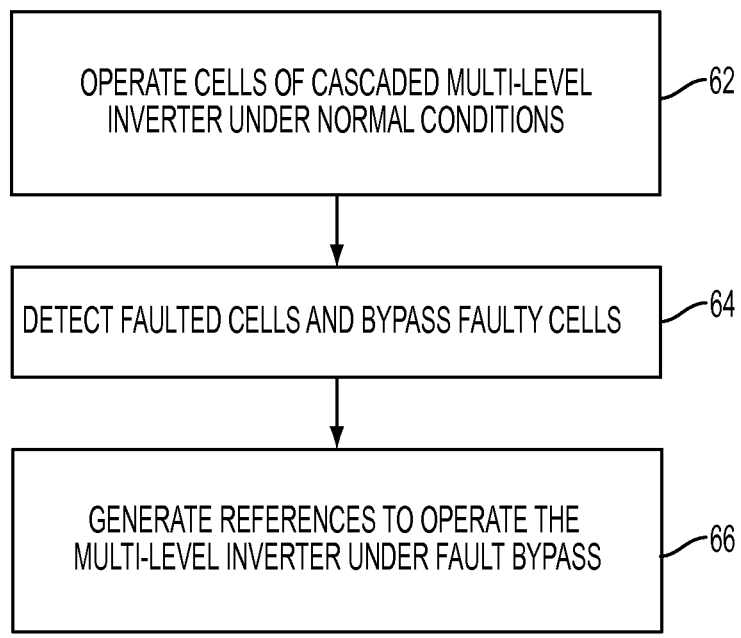
FIG. 4 is a flow chart diagram of one embodiment of a method for control in fault-bypass of a cascaded multi-level inverter.
Figure 5:
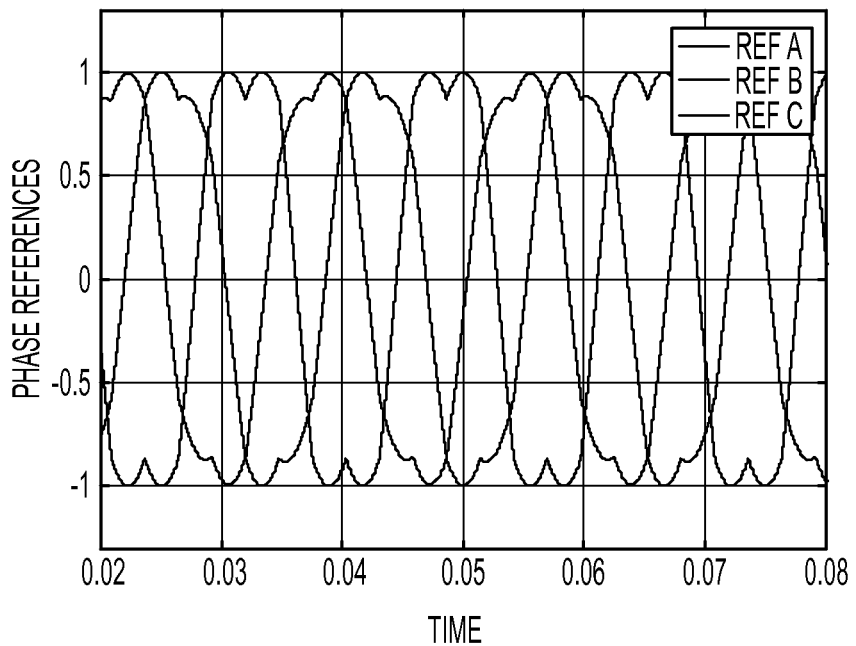
FIG. 5 is an example simulation of phase references with one cell bypassed in a phase.
Figure 6:
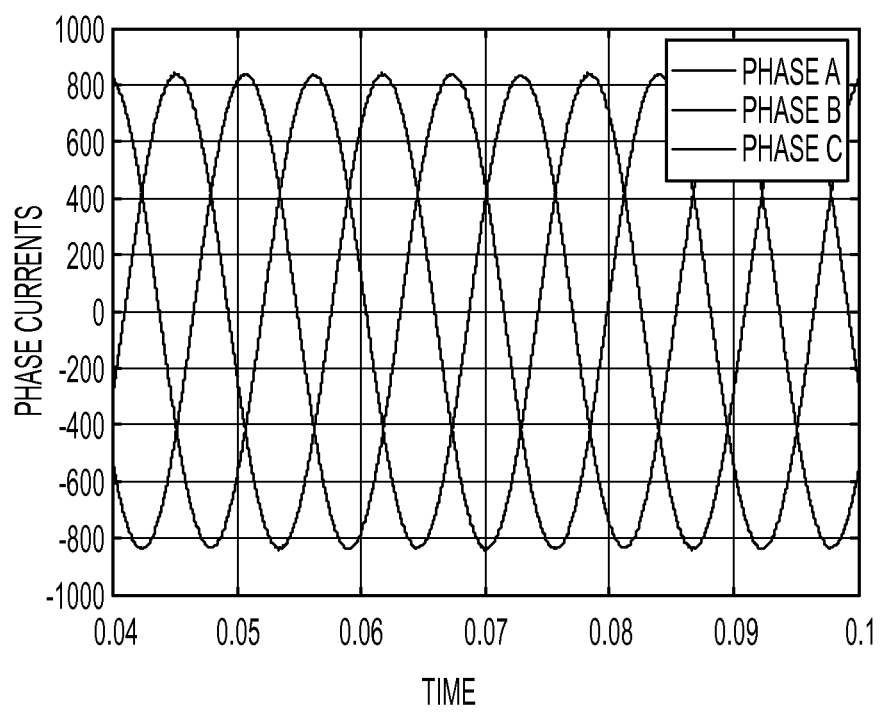
FIG. 6 is an example simulation of phase currents with one cell bypassed in a phase.
Figure 7:
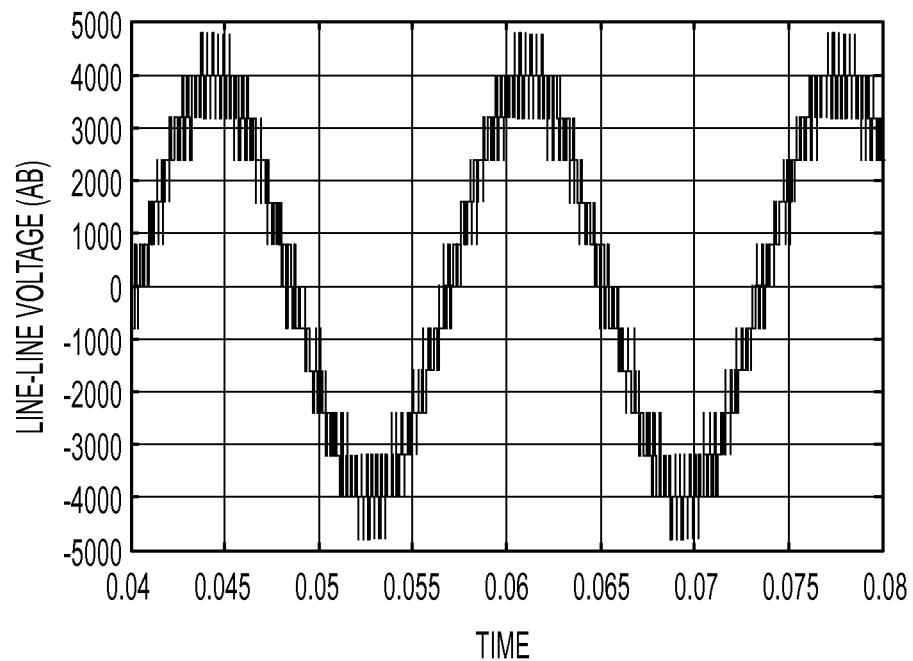
FIG. 7 is an example simulation of the line-line voltage between phases A and B with one cell bypassed in phase C.
Figure 8:
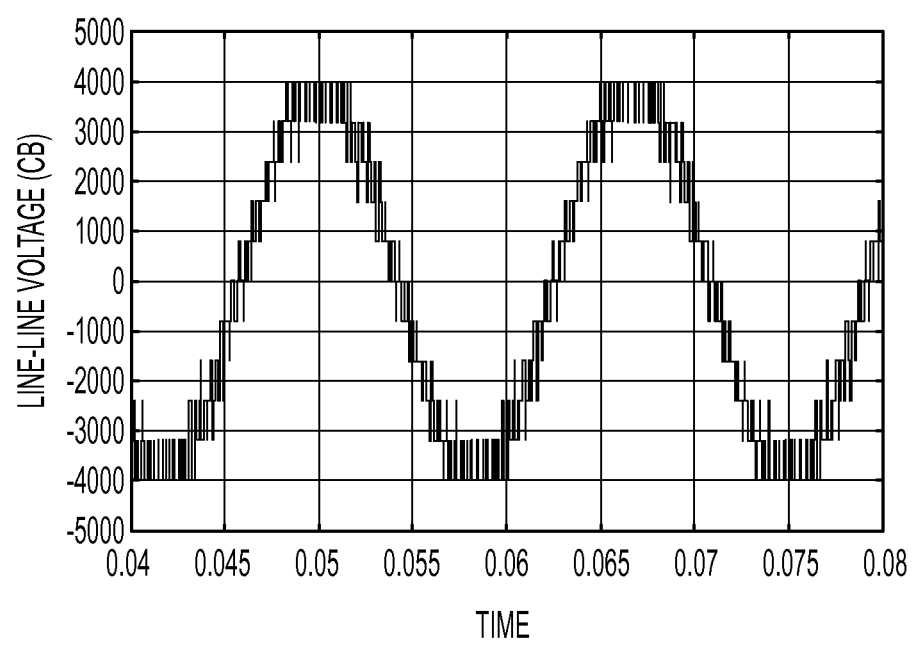
FIG. 8 is an example simulation of the line-line voltage between phases B and C with one cell bypassed in phase C.
Figure 9:
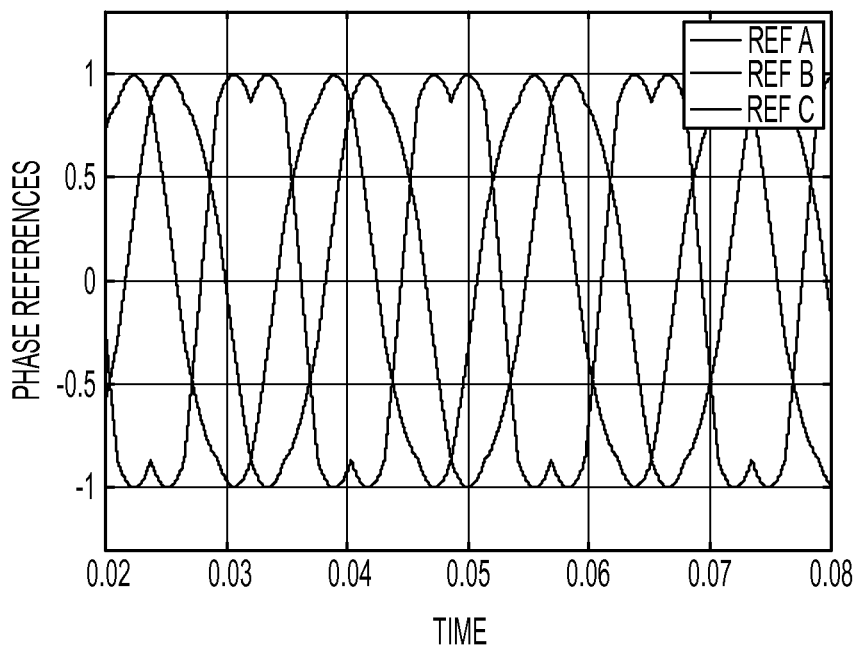
FIG. 9 is an example simulation of phase references with two cell bypassed in a phase.
Figure 10:
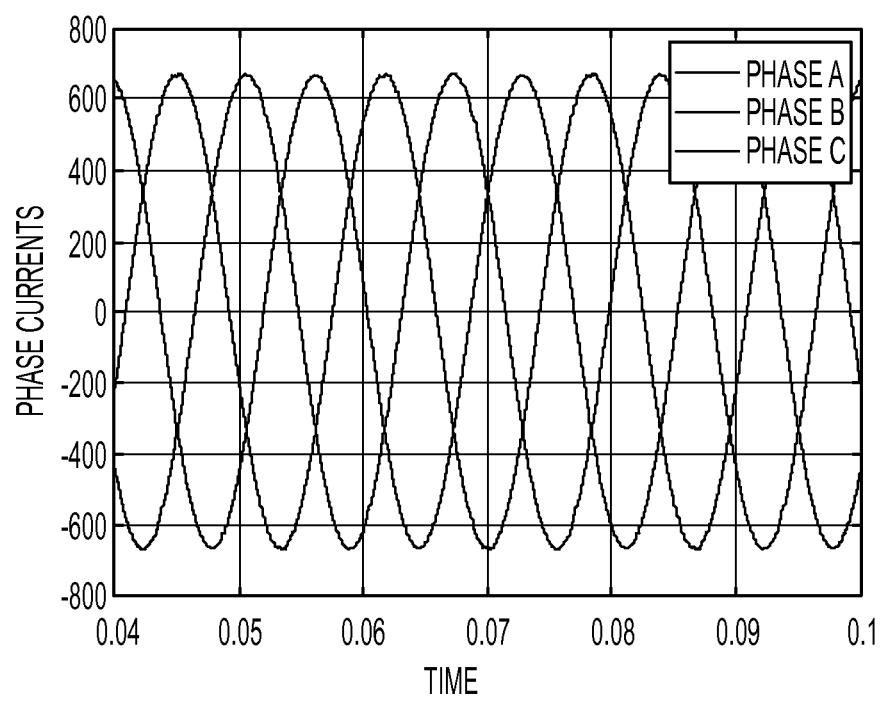
FIG. 10 is an example simulation of phase currents with two cell bypassed in a phase.
Figure 11:
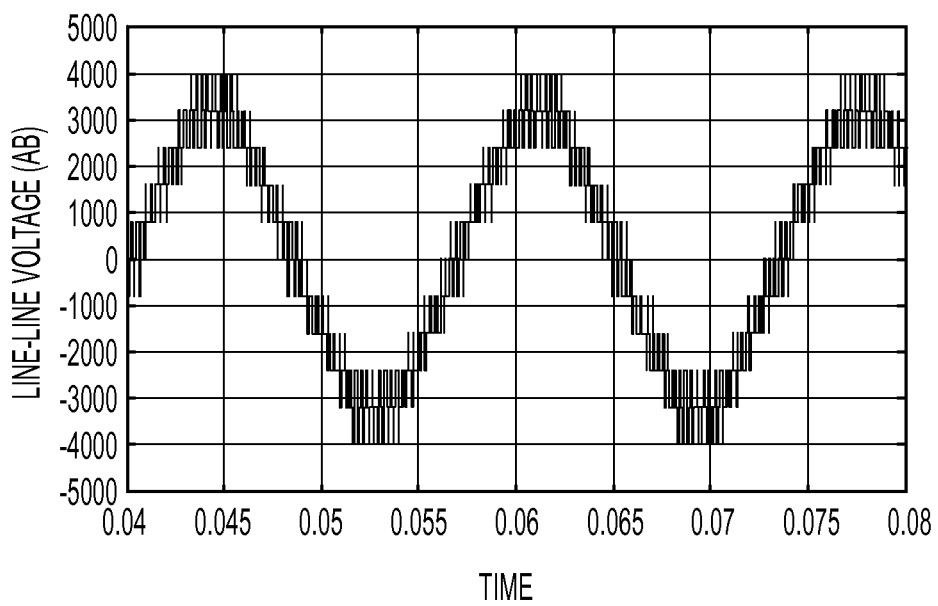
FIG. 11 is an example simulation of the line-line voltage between phases A and B with two cells bypassed in phase C.
Figure 12:
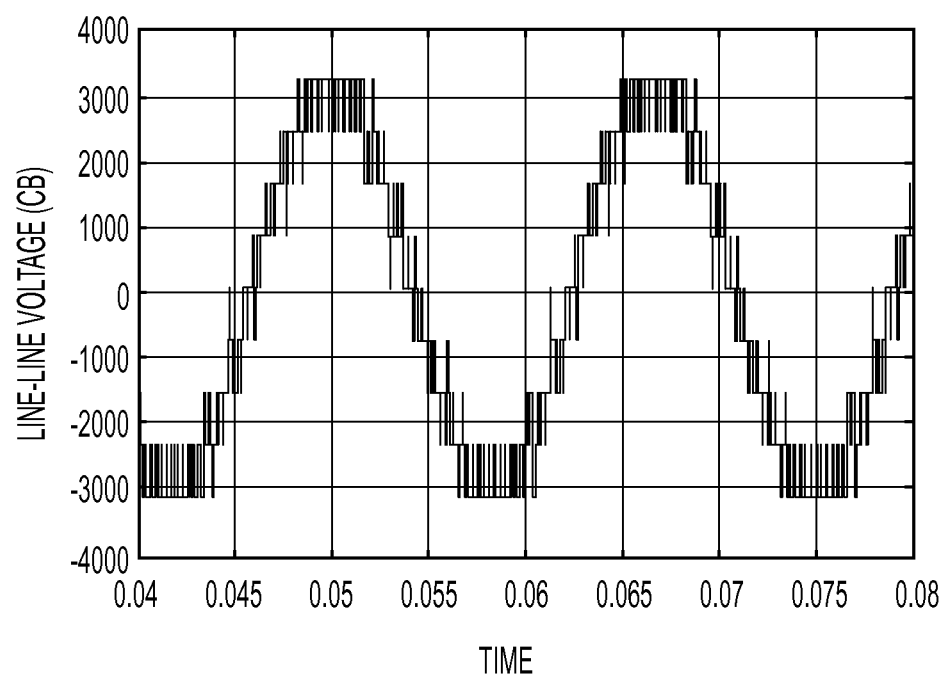
FIG. 12 is an example simulation of the line-line voltage between phases B and C with two cells bypassed in phase C.
Figure 13:
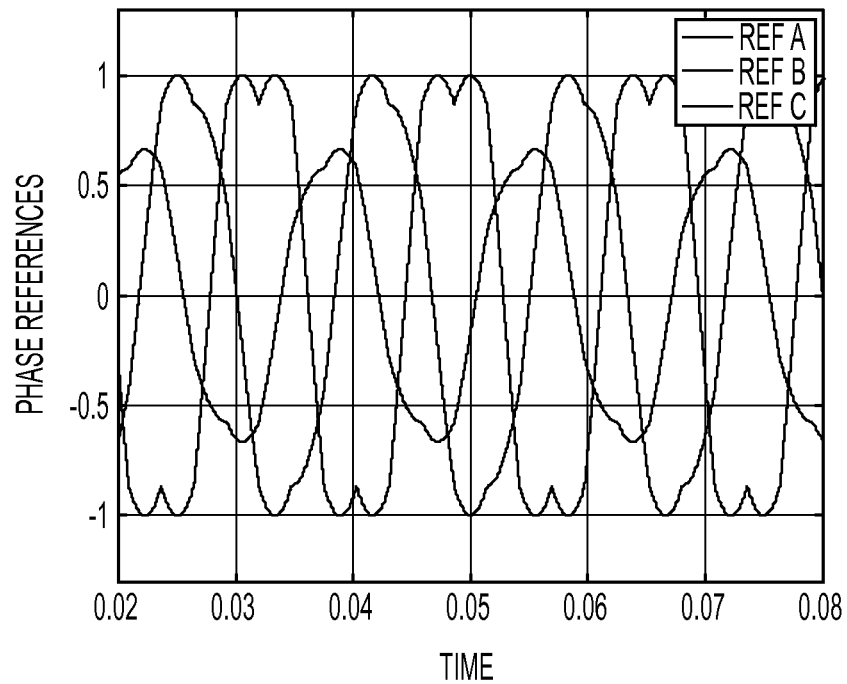
FIG. 13 is an example simulation of phase references with two cells bypassed in phase C and one cell bypassed in phase B.
Figure 14:
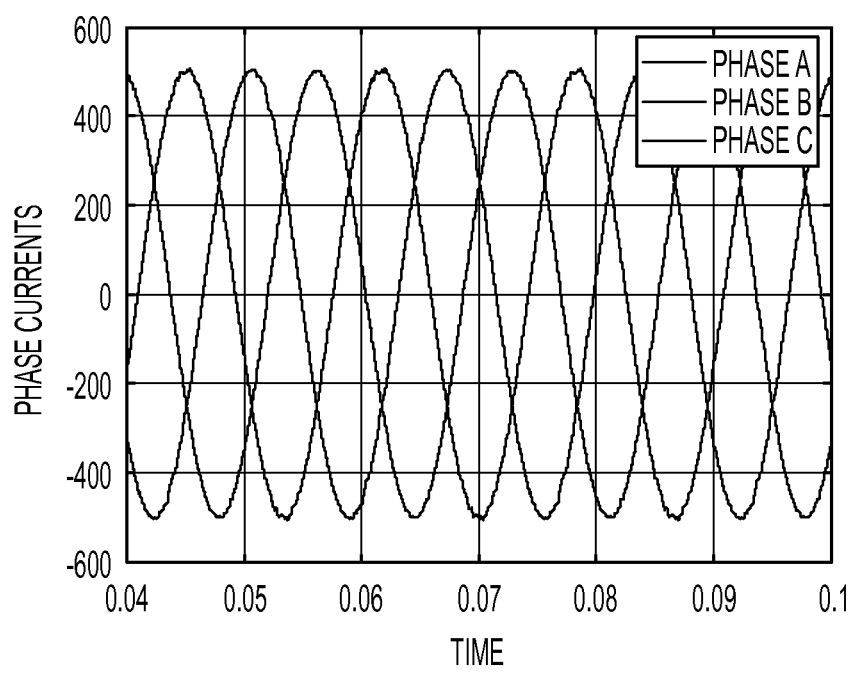
FIG. 14 is an example simulation of phase currents with two cells bypassed in phase C and one cell bypassed in phase B.
Figure 15:
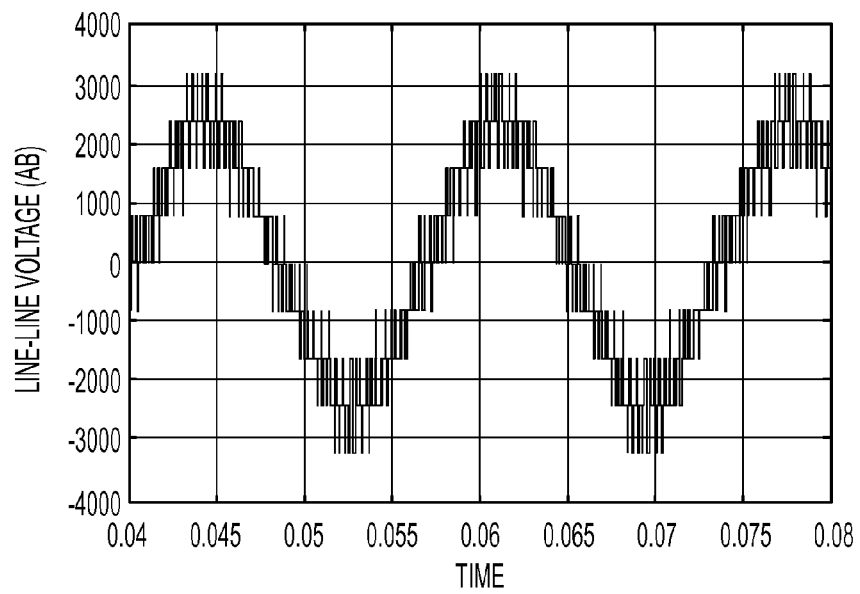
FIG. 15 is an example simulation of the line-line voltage between phases A and B with two cells bypassed in phase C and one cell bypassed in phase B.
Figure 16:
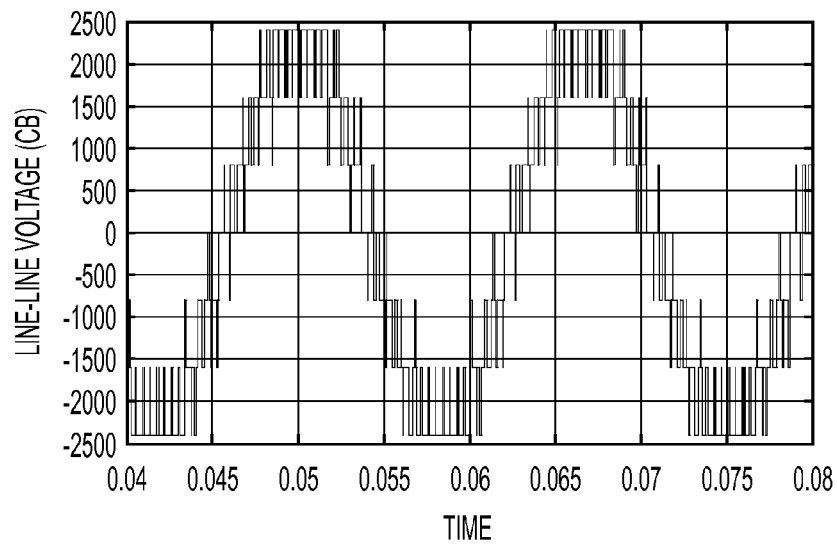
FIG. 16 is an example simulation of the line-line voltage between phases B and C with two cells bypassed in phase C and one cell bypassed in phase B.

FIG. 4 shows one embodiment of a method for control in fault-bypass of a cascaded multi-level inverter. The method is implemented by the system of FIG. 1, a plurality of the cells 16 of FIG. 2, and/or another system or cells. The acts are performed in the order shown and/or, additional, different, or fewer acts may be provided.

In act 62, initially the cascaded multi-level inverter is operated in a normal mode where no cells are faulted. In act 64, one or more cells in one or more phases become inoperable or operate incorrectly. For example, one or more transistors or other circuit components burn out, short, or open.

These faulty cells are bypassed. The result is a different number of cells contributing to the output of the inverter. The numbers of cells for each phase are equal or different.

A check may be performed to determine whether sufficient numbers of cells are operable in each phase. Some combinations of operable cells per phase may result in the drive overvoltage trip if the power factor exceeds certain limits.

For fault bypass operation, the cells are controlled differently to account for the bypassed cells. For pulse width modulation control, the reference voltage for establishing the pulse widths is altered. In act 66 where one or more cells are bypassed, the reference voltages change to account for the bypass.

The operable cells respond to pulse width modulation signals. The same reference voltage is used by all cells of each leg to establish the pulse width modulation. In response to the control, the cells of the different legs output equal magnitude voltages between the three phases. A balanced phase relationship is provided in the line-to-line output voltage.

In act 64 the bypassed cells are identified for bypass operation. The specific cells that are active or inactive are determined.

The cells are identified from the control of the cells. Where a cell is no longer responsive or where other processes have determined a cell is to be bypassed, the determination is used to identify the cells. Alternatively, an electronic circuit detects a malfunction, and the faulty cell is identified from the output of this circuit. In another embodiment, proper operation is sensed. The faulty or bypassed cells are identified by not being included in a list of properly operating cells. Any approach may be used to identify the cells for bypass or being bypassed.

The numbers of bypassed and/or operable cells for each phase are determined. One phase may have more or fewer operable cells with a corresponding more or fewer faulty cells than another phase.

In act 66, the operation of the operable cells is controlled. The reference voltage used to establish pulse width modulation is set based on the number of active cells. The reference voltages are calculated. Alternatively, the pre-calculated reference voltages for a given bypass situation are looked up.

The reference voltages are calculated by modeling the inverter as a combination of three inverters. The first inverter has the same number of cells on each leg, equal to the minimum number of available cells on each leg. The second inverter has two legs with a number of cells equal to the difference between the middle number of cells in one leg and the minimum number of cells in another leg. The third leg of the second inverter has no cells. The third inverter has one leg with a number of cells equal to the difference between the maximum number of cells in one leg and the medium number of cells in another leg. The second and third legs of the third inverter have no cells.

The leg with the most operable cells may be operated in one of two ways. In a first way, all of the operable cells are controlled. In a second way, only a number of cells equal to the number of cells on the leg with the middle number are operated. The reference voltage and/or pulse width modulation for the leg with the greatest number of cells is set based on the selected number of cells to use.

The reference voltages represent an analytic solution. The control of the operation is performed without feedback from voltage output of the cascaded multilevel inverter. The processor 20 generates the reference voltages without feedback. The voltage output by one or more cells 16, by one or more legs 14, or to the AC motor 18 is not used in a feedback path to set the reference voltage. No feedback gain accuracy is needed. The frequency of the cascaded multilevel inverter drive may be high since no feedback gain limits high frequency operation. The reference voltages are generated without approximation based on the number of active to inactive cells for a given phase. An approximation based on the number of active to inactive cells in phase A is not used; an approximation based on the number of active to inactive cells in phase B is not used; and an approximation based on the number of active to inactive cells in phase C is not used. Different ratios are used, based on the relationship of active cells between phases.

FIGS. 5-26 relate to a computer simulation using the analytically calculated voltage references. The simulated drive is a PERFECT HARMONY drive from SIEMENS with nine cells, three cells per phase. Nine carriers under normal conditions when no cells are bypassed are used. The carrier is a triangle wave compared with the reference voltage for establishing the pulse wave modulation. The switching frequency is assumed to be 600 Hz for each transistor (e.g., IGBT), and the output frequency is 60 Hz. A star connected R-L load is considered with the values of 2 ohms and 5 mH, respectively. Each DC-link voltage of the H-bridge cell (see FIG. 2) is assumed as 800 Vdc. Unless otherwise specified, the waveforms are depicted at maximum modulation index.

Figure 17:
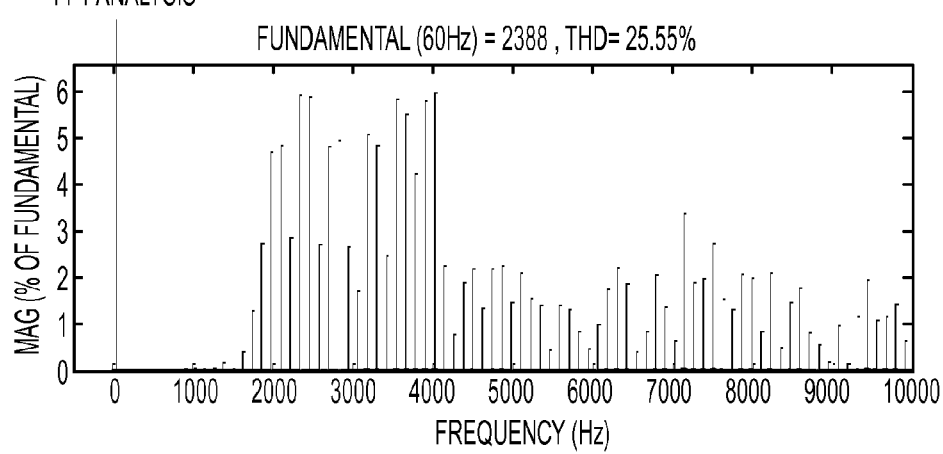
FIG. 17 is a spectrum of line-line voltage between phases A and B of one example with two cells bypassed on phase C and one cell bypassed on phase B.
Figure 18:
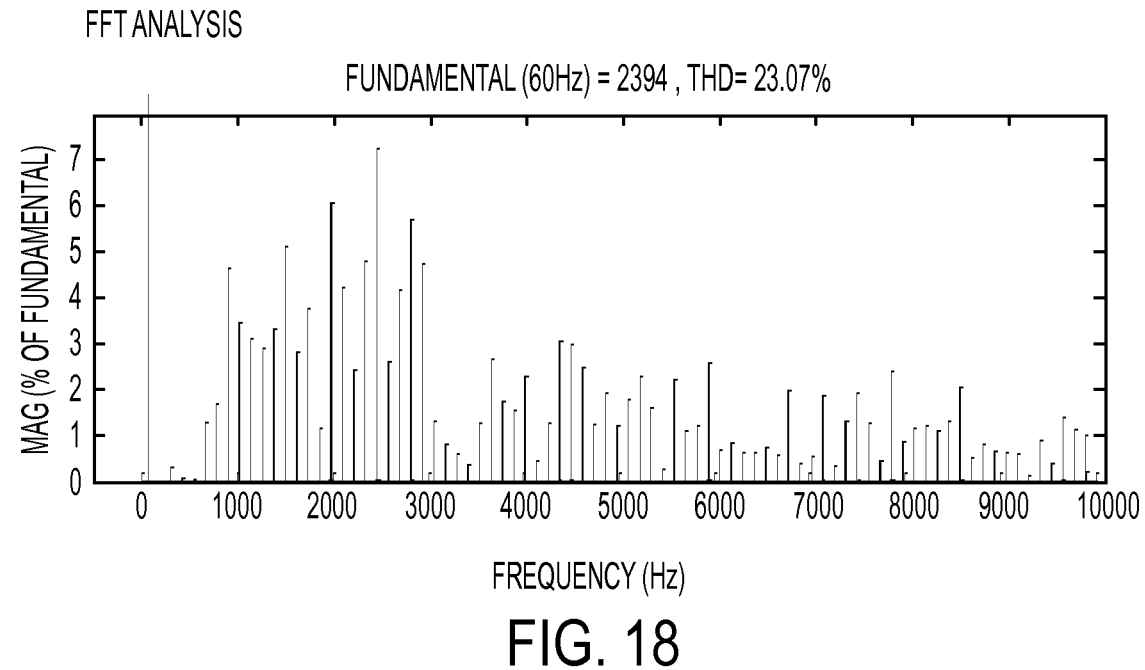
FIG. 18 is a spectrum of line-line voltage between phases B and C of one example with two cells bypassed on phase C and one cell bypassed on phase B.
Figure 19:
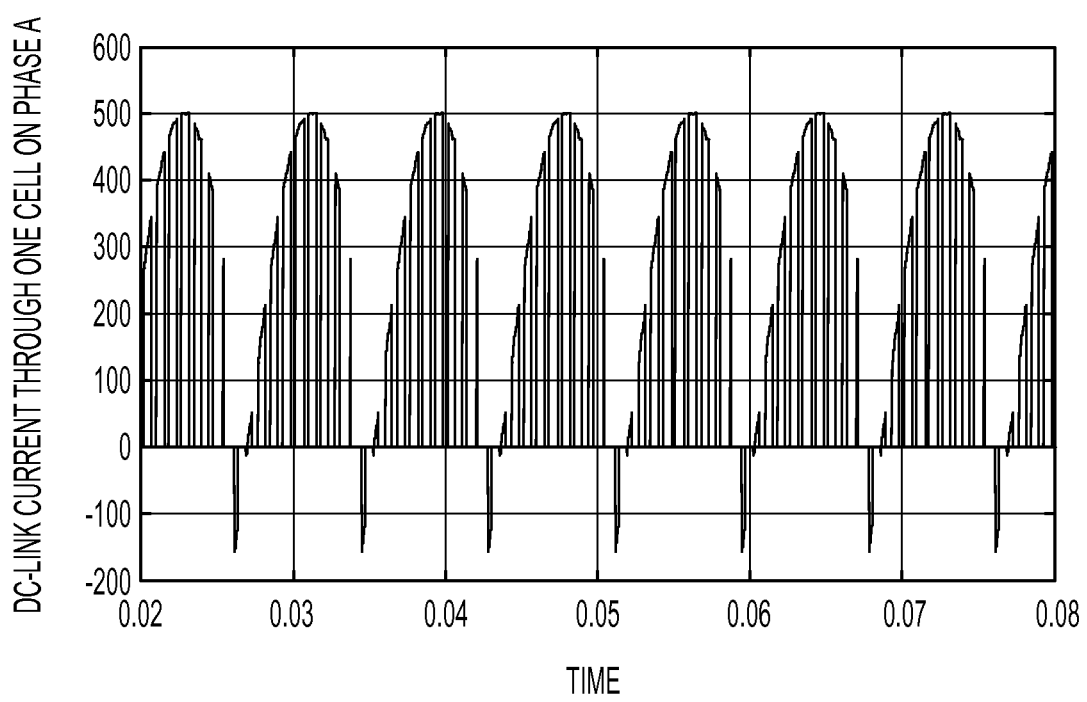
FIG. 19 is a simulated DC-link current through one cell of phase A with two cells bypassed on phase C and one cell bypassed on phase B.
Figure 20:
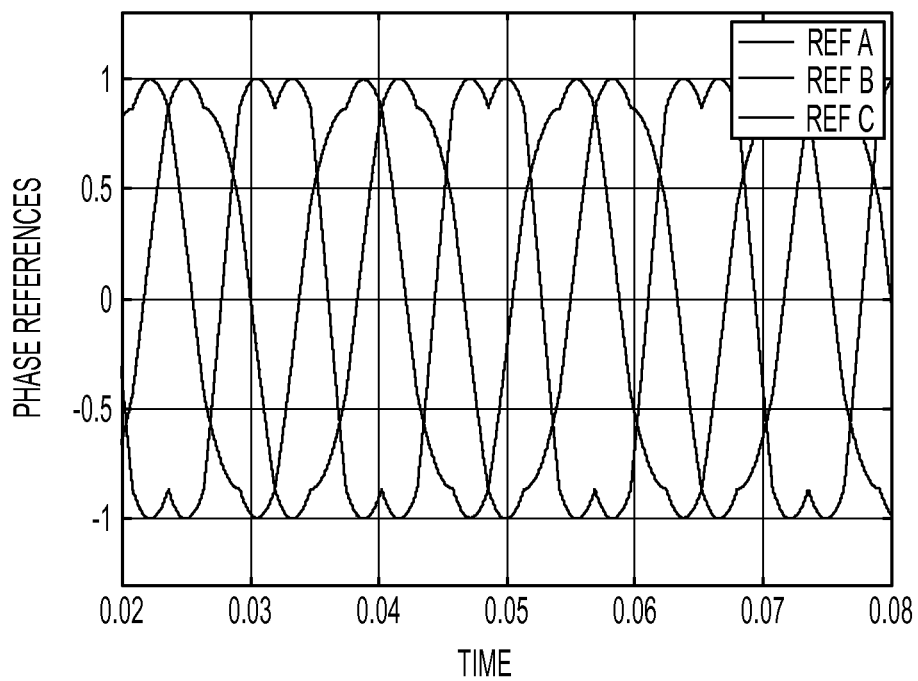
FIG. 20 is an example simulation of phase references with two cells bypassed in phase C and one cell bypassed in each of phases A and B.
Figure 21:
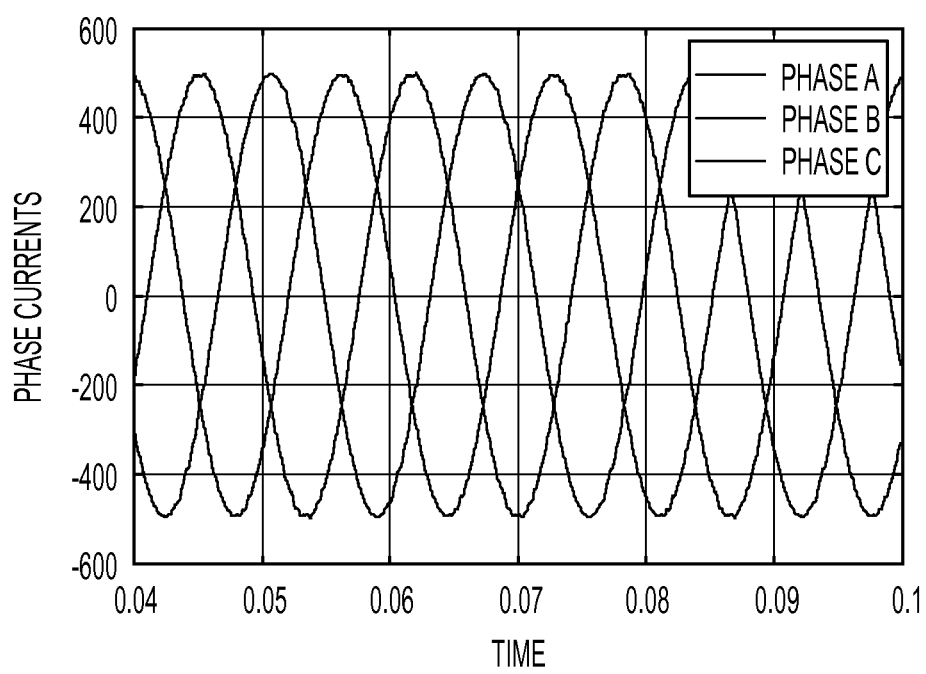
FIG. 21 is an example simulation of phase currents with two cells bypassed in phase C and one cell bypassed in each of phases A and B.
Figure 22:
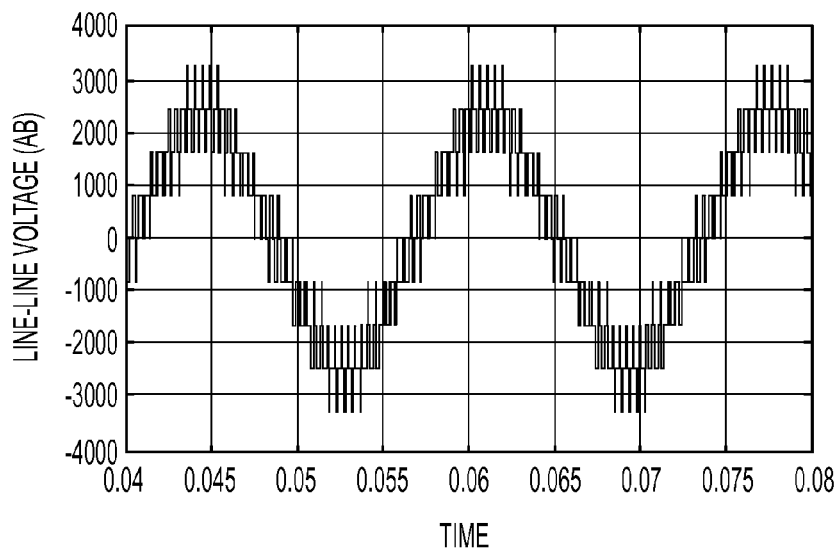
FIG. 22 is an example simulation of the line-line voltage between phases A and B with two cells bypassed in phase C and one cell bypassed in each of phases A and B.
Figure 23:
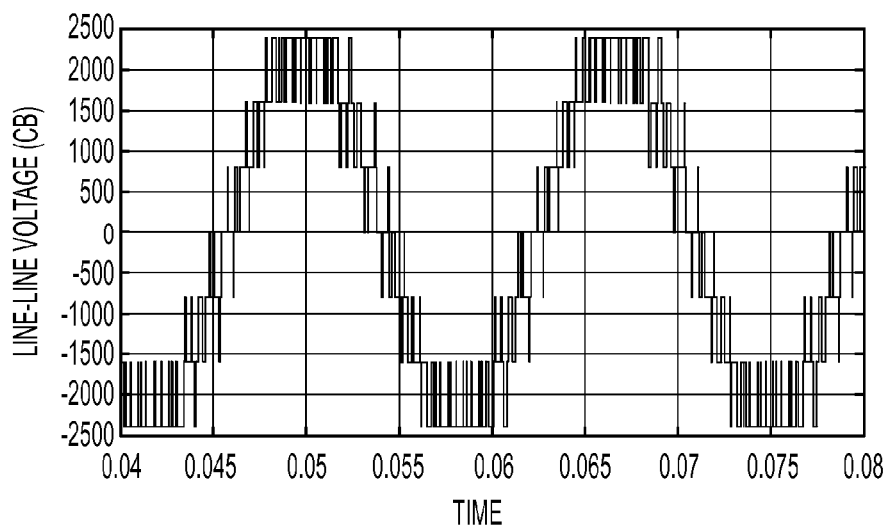
FIG. 23 is an example simulation of the line-line voltage between phases B and C with two cells bypassed in phase C and one cell bypassed in each of phases A and B.
Figure 24:
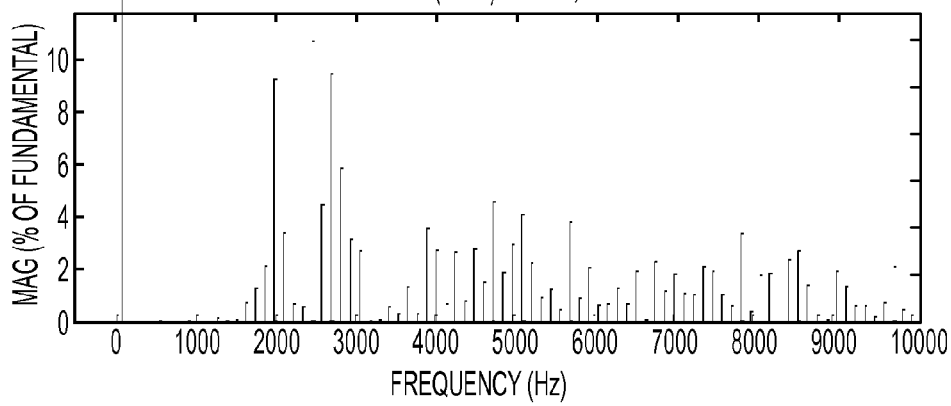
FIG. 24 is a spectrum of line-line voltage between phases A and B of one example with two cells bypassed on phase C and one cell bypassed on each of phases A and B.
Figure 25:
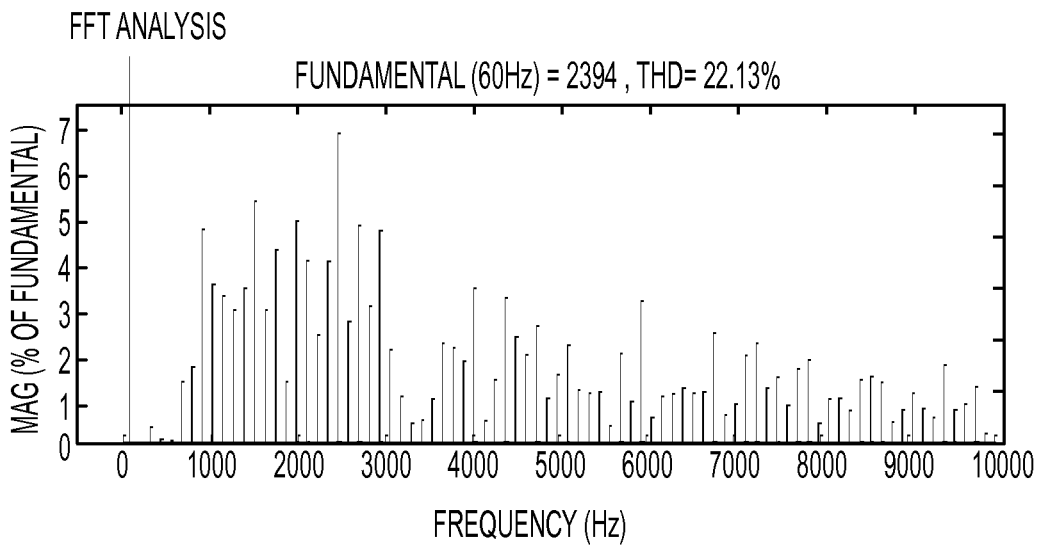
FIG. 25 is a spectrum of line-line voltage between phases B and C of one example with two cells bypassed on phase C and one cell bypassed on each of phases A and B.
Figure 26:
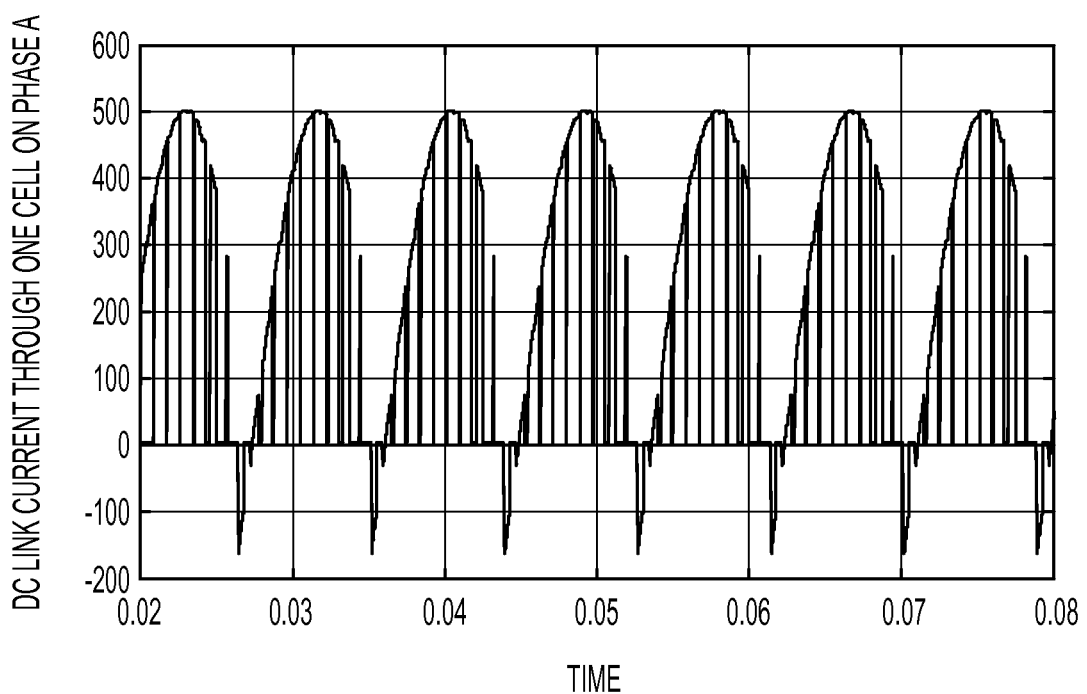
FIG. 26 is a simulated DC-link current through one cell of phase A with two cells bypassed on phase C and one cell bypassed on each of phases A and B.

FIGS. 5-8 depict the voltage references on each phase, the phase currents, and line-to-line voltages from A to B and B to C, respectively, for the case where one cell is bypassed in phase C. FIGS. 9-12 depict the voltage references on each phase, the phase currents, and line-to-line voltages from A to B and B to C, respectively, for the case where two cells are bypassed in phase C. FIGS. 13-16 depict the voltage references on each phase, the phase currents, and line-to-line voltages from A to B and B to C, respectively, for the case where two cells are bypassed in phase C and one cell on phase B. The harmonic spectrum of two line-line voltages (A to B) and (B to C) are depicted in FIGS. 17 and 18, respectively. FIG. 19 is a simulated DC-link current through one cell of phase A with two cells bypassed on phase C and one cell bypassed on phase B. FIGS. 20-22 depict the voltage references on each phase, the phase currents, and line-to-line voltages from A to B and B to C, respectively, for the case where two cells are bypassed in phase C and one cell each, on phases A and B. FIG. 23 is an example simulation of the line-line voltage between phases B and C with two cells bypassed in phase C and one cell bypassed in each of phases A and B. The harmonic spectrum of two line-line voltages (A to B) and (B to C) are depicted in FIGS. 24 and 25, respectively. FIG. 26 is a simulated DC-link current through one cell of phase A with two cells bypassed on phase C and one cell bypassed on each of phases A and B.

Where phase A has all three cells functioning and one more than either of the other two phases, either three or two cells may be used on phase A. One drive configuration (Na=3, Nb=2, Nc=1) may be compared with the other drive configuration (Na=2, Nb=2, Nc=1) configuration. This other configuration is one in which one healthy cell has been intentionally bypassed on phase A. Table I compares the two configurations, showing that the differences are rather minor in terms of waveforms quality.

TABLE I

Comparison between two bypass configurations

| Configuration | Total Harmonic Distortion (THD %) | | | | |
|---|---|---|---|---|---|
| | $I_a$ | $I_b$ | $I_c$ | $V_{ab}$ | $V_{bc}$ |
| 321 (Two faulty cells in phase C and one in phase B) | 0.72 | 0.81 | 1.04 | 25.55 | 23.07 |
| 221 (Two faulty cells in phase C and one in phase B plus one healthy cell bypassed on phase A) | 0.83 | 0.83 | 1.03 | 26.03 | 22.13 |

Table II confirms that both configurations output the same maximum output voltage, a result which is in accordance with equation (30).

TABLE II

Maximum voltage comparison between two bypass configurations

| Configuration | Maximum Line-Line Voltage (Fundamental) | |
|---|---|---|
| | $V_{ab}$ | $V_{bc}$ |
| 321 (Two faulty cells in phase C and one in phase B) | 2388 | 2394 |
| 221 (Two faulty cells in phase C and one in phase B plus one healthy cell bypassed on phase A) | 2388 | 2394 |

The simulated fundamental voltage in Table II are very close to the ideal maximum voltage according to equation (30), which is (Mid+Min)*Vdc=3*800=2400 Vac.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

I claim:

1. A system for control in fault-bypass of a cascaded multi-level inverter, the system comprising:
a first plurality of first inverter leg cells connected in series for a first phase;
a second plurality of second inverter leg cells connected in series for a second phase;
a third plurality of third inverter leg cells connected in series for a third phase; and
wherein the fault-bypass results in a difference in numbers between the first inverter leg cells in the first plurality and the second inverter leg cells in the second plurality being active;
a processor configured to generate reference voltages, free of feedback, for active ones of the first, second, and third leg inverter cells, all of the active first inverter leg cells being operated with a first common one of the reference voltages, all of the active second inverter leg cells being operated with a second common one of the reference voltages, and all of the active third inverter leg cells being operated with a third common one of the reference voltages, the second common one of the reference voltages calculated using the difference as a variable in the calculation.

2. The system of claim 1 further comprising a memory, the memory comprising a look up table of the reference voltages, the look up table outputting the reference voltages as a function of input of numbers of active first, second, and third inverter leg cells.

3. The system of claim 1 wherein the first, second, and third inverter leg cells operate with pulse wave modulation responsive to the reference voltages.

4. The system of claim 1 wherein the processor is configured to generate the reference voltages without approximation based on a number of the active of the first inverter leg cells, of the second inverter leg cells, and of the third inverter leg cells.

5. The system of claim 1 wherein the number of the active first inverter leg cells is less than the number of the active second inverter leg cells and wherein the processor is configured to generate the reference voltages as an analytic solution based on the numbers of the active first and second inverter leg cells.

6. The system of claim 5 wherein the processor is configured to generate the reference voltage for the first inverter leg cells as a function of:

$$\frac{2}{\sqrt{3}} \cdot \cos\left(\omega \cdot t + \frac{2 \cdot \pi}{3}\right) + CMO,$$

where CMO is a common mode offset, $\omega$ is the frequency, and $t$ is the time, and to generate the reference voltage for the second inverter leg cells as a function of:

$$\frac{N_c}{N_b} \cdot \left(\frac{2}{\sqrt{3}} \cdot \cos\left(\omega \cdot t - \frac{2 \cdot \pi}{3}\right) + CMO\right) + \frac{(N_b - N_c)}{N_b} \cdot \cos\left(\omega \cdot t - \frac{\pi}{2}\right),$$

where Nc is the number of the active first inverter leg cells, Nb is the number of the active second inverter leg cells.

7. The system of claim 6 wherein the processor is configured to generate, when all of the active third inverter leg cells are used, the reference voltage for the third inverter leg cells as a function of:

$$\frac{N_c}{N_a} \cdot \left(\frac{2}{\sqrt{3}} \cdot \cos(\omega \cdot t) + CMO\right) + \frac{(N_b - N_c)}{N_a} \cdot \cos\left(\omega \cdot t - \frac{\pi}{6}\right),$$

where Na is the number of the active third inverter leg cells.

8. The system of claim 6 wherein the number Na of the active third inverter leg cells is greater than Nb and Nc, and wherein the processor is configured to generate, when Na−Nb of the active third inverter leg cells are not operated, the reference voltage for the third inverter leg cells as a function of:

$$\frac{N_c}{N_b} \cdot \left(\frac{2}{\sqrt{3}} \cdot \cos(\omega \cdot t) + CMO\right) + \frac{(N_b - N_c)}{N_b} \cdot \cos\left(\omega \cdot t - \frac{\pi}{6}\right),$$

wherein Na is the number of the active third inverter leg cells.

9. The system of claim 1 wherein the processor is configured to generate the reference voltages for the first, second, and third inverter leg cells such that an equal magnitude voltage is provided between each of the first, second, and third phases and such that there is a balanced phase relationship in line-to-line output voltage.

10. The system of claim 1 wherein the processor is configured to generate the reference voltages as a function of a first set of the first, second, and third inverter leg cells where a number of each of the first, second, and third inverter leg cells is equal and the processor is configured to generate the references voltages as a function of a second set of the first and second inverter leg cells and not the third inverter leg cells.

11. The system of claim 1 wherein the number Na of the first active inverter leg cells is greater than the number Nb of the second active inverter leg cells, and the number Nb of the second active inverter leg cells is greater than a number Nc of the third active inverter leg cells, and wherein the processor is configured to generate the reference voltages resulting in a maximum line to line voltage of the first, second, and third phases that is a sum of voltages from Nc and Nb of the active inverters leg cells.

12. A method for control in fault-bypass of a cascaded multi-level inverter, the method comprising:
   operating the cascaded multi-level inverter in the fault-bypass;
   identifying a first leg as having fewer operating cells of the multi-level inverter than a second leg of the multi-level inverter during the operating; and
   controlling, free of feedback, the operating of the greater number of cells of the second leg as a function of a number of the operating cells of the first leg, the function being an analytic solution using a ratio of the number of the operating cells of the first leg and the greater number of the operating cells of the second leg as a variable.

13. The method of claim 12 wherein operating comprises pulse width modulating less than all of the cells of the first leg, the cells of the second leg, and cells of a third leg, and wherein controlling comprises generating a reference voltage controlling the pulse width modulating.

14. The method of claim 12 wherein operating comprises bypassing at least one of the cells of the first leg, and wherein identifying comprises determining that the at least one of the cells is being bypassed.

15. The method of claim 12 wherein controlling comprises generating a same first reference voltage for all of the operating cells of the first leg and generating a same second reference voltage for all of the operating cells of the second leg.

16. The method of claim 12 further comprising:
   identifying the second leg as having fewer operating cells of the multi-lever inverter than a third leg of the cascaded multi-level inverter during the operating;
   wherein controlling comprises operating the third leg with fewer than all operable ones of the cells.

17. The method of claim 12 wherein operating comprises outputting with equal magnitude voltage being provided between the first leg, the second leg, and a third leg and such that there is a balanced phase relationship in line-to-line output voltage.

18. The method of claim 12 wherein the first leg has Nc operating cells, the second leg has Nb operating cells, and a third leg has Na operating cells where Nc<Nb≤Na, and wherein controlling comprises generating a voltage reference for the first leg as:

$$\frac{2}{\sqrt{3}} \cdot \cos\left(\omega \cdot t + \frac{2 \cdot \pi}{3}\right) + CMO,$$

where $\omega$ is a frequency, t is time and CMO is a common mode offset, for the second leg as:

$$\frac{N_c}{N_b} \cdot \left(\frac{2}{\sqrt{3}} \cdot \cos\left(\omega \cdot t - \frac{2 \cdot \pi}{3}\right) + CMO\right) + \frac{(N_b - N_c)}{N_b} \cdot \cos\left(\omega \cdot t - \frac{\pi}{2}\right),$$

and for the third leg as one of:

$$\frac{N_c}{N_a} \cdot \left(\frac{2}{\sqrt{3}} \cdot \cos(\omega \cdot t) + CMO\right) + \frac{(N_b - N_c)}{N_a} \cdot \cos\left(\omega \cdot t - \frac{\pi}{6}\right),$$

or $$\frac{N_c}{N_b} \cdot \left(\frac{2}{\sqrt{3}} \cdot \cos(\omega \cdot t) + CMO\right) + \frac{(N_b - N_c)}{N_b} \cdot \cos\left(\omega \cdot t - \frac{\pi}{6}\right).$$

19. A system for control in fault-bypass of a cascaded multi-level inverter, the system comprising:
   first, second, and third legs of the cascaded multi-level inverter, at least the third leg having a fewer number of cells operating than a number of the second leg and a number of the first leg; and
   a processor configured to control a pulse width modulation of the cells of the first, second, and third legs as a function of first, second, and third reference voltages, respectively, the first, second and third reference voltages each including a term for a balanced number of cells in the first, second and third legs, and the first and second reference voltages including a term for a difference between the fewer number of cells of the third leg and the number of the second leg without a difference between the number of the first leg and the number of the second leg or the number of the third leg.

20. The system of claim 19 wherein the processor is configured to generate the third reference voltage, the first and second reference voltages being a first ratio of the third reference voltage, the first ratio comprising a function of the number of cells of the third leg, plus a second ratio of another term, the second ratio comprising a function of the number of cells of the second leg minus the number of cells of the third leg.

* * * * *